(12) United States Patent
Shiraishi

(10) Patent No.: US 8,259,359 B2
(45) Date of Patent: Sep. 4, 2012

(54) IMAGE PROCESSING DEVICE AND IMAGE FORMING APPARATUS EQUIPPED WITH THE IMAGE PROCESSING DEVICE

(75) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 532 days.

(21) Appl. No.: 12/258,642

(22) Filed: Oct. 27, 2008

(65) Prior Publication Data

US 2009/0128857 A1  May 21, 2009

(30) Foreign Application Priority Data

Nov. 17, 2007 (JP) .................................. 2007-298730

(51) Int. Cl.
*G06K 15/00* (2006.01)
(52) U.S. Cl. ...................................................... 358/3.03
(58) Field of Classification Search .............. 358/296, 358/3.03, 1.13, 3.23, 1.9; 382/232, 298, 382/239; 347/10; 348/207.1
See application file for complete search history.

(56) References Cited

U.S. PATENT DOCUMENTS

| | | | | | |
|---|---|---|---|---|---|
| 5,414,527 | A | * | 5/1995 | Koshi et al. | 382/239 |
| 5,535,007 | A | * | 7/1996 | Kim | 358/296 |
| 6,079,806 | A | * | 6/2000 | Wen et al. | 347/10 |
| 6,219,454 | B1 | * | 4/2001 | Kawano et al. | 382/232 |
| 6,915,017 | B2 | | 7/2005 | Shiraishi | |
| 6,941,023 | B2 | | 9/2005 | Shiraishi | |
| 7,009,622 | B2 | | 3/2006 | Shiraishi | |
| 7,079,691 | B2 | | 7/2006 | Shiraishi | |
| 7,233,702 | B2 | | 6/2007 | Shiraishi | |
| 7,359,557 | B2 | | 4/2008 | Shiraishi | |
| 2005/0062994 | A1 | | 3/2005 | Shiraishi | |
| 2005/0151991 | A1 | | 7/2005 | Shiraishi | |
| 2005/0200910 | A1 | | 9/2005 | Kanoshima et al. | |
| 2005/0207667 | A1 | | 9/2005 | Shiraishi | |
| 2005/0246684 | A1 | | 11/2005 | Shiraishi | |
| 2006/0072142 | A1 | | 4/2006 | Shiraishi | |

FOREIGN PATENT DOCUMENTS

| | | |
|---|---|---|
| JP | 7-262351 | 10/1995 |
| JP | 9-168086 | 6/1997 |
| JP | 3609189 | 10/2004 |
| JP | 2004-320361 | 11/2004 |
| JP | 2005-275854 | 10/2005 |

OTHER PUBLICATIONS

Japanese Office Action issued Dec. 16, 2011 in patent application No. JP2007-298730.

* cited by examiner

*Primary Examiner* — Charlotte M Baker
*Assistant Examiner* — Rury Grisham
(74) *Attorney, Agent, or Firm* — Oblon, Spivak, McClelland, Maier & Neustadt, L.L.P.

(57) ABSTRACT

A band plotting processing unit analyzes input data to plot in pixel units an image of RGB data corresponding to a character image to be printed, analyzes the input data to generate micropixel RGB data of a low resolution and micropixel shape information (DOT information) of a high resolution. The low resolution image is then converted to a high resolution output image based on the RGB data, the DOT information, and the micropixel RGB data stored in a main memory.

7 Claims, 22 Drawing Sheets

- 1200 dpi IMAGE

- 600 dpi RGB BAND MEMORY EXAMPLE

- 600 dpi MICROPIXEL BAND MEMORY EXAMPLE

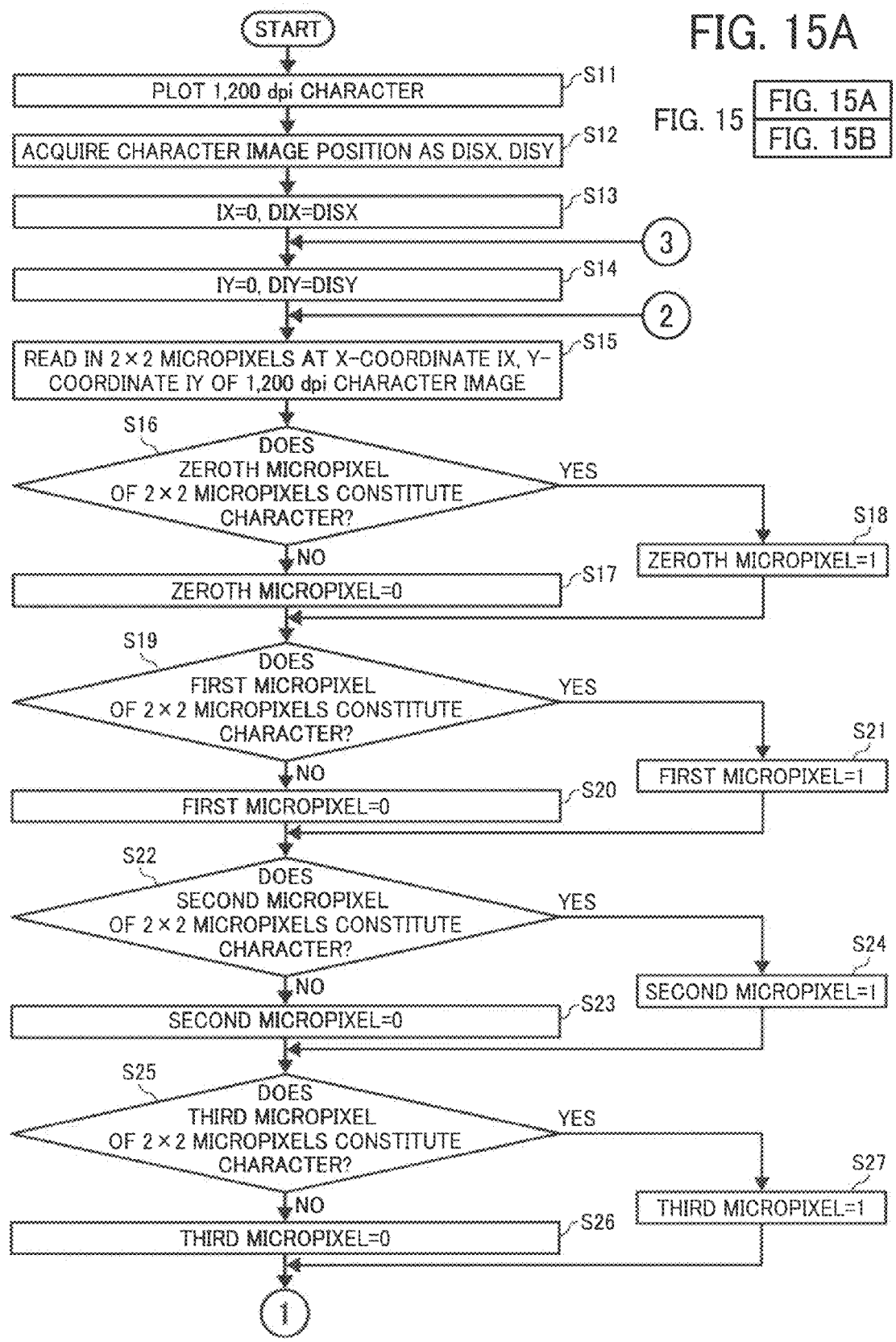

• 1200 dpi CHARACTER IMAGE

• CHARACTER IMAGE OF 600 dpi
  MICROPIXEL RGB BAND IMAGE

• CHARACTER IMAGE OF 600 dpi
  MICROPIXEL BAND

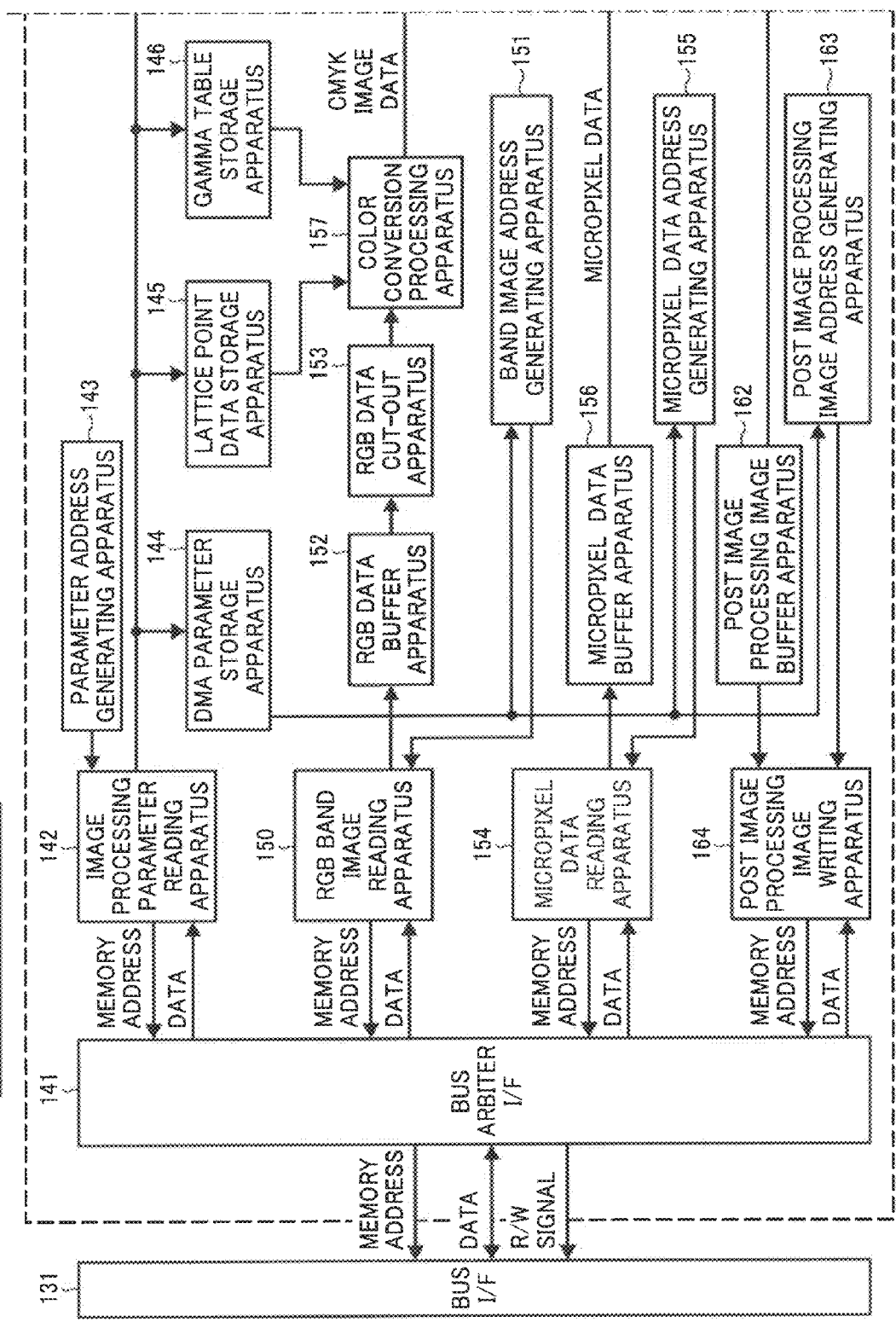

IMAGE PROCESSING DEVICE AND IMAGE FORMING APPARATUS EQUIPPED WITH THE IMAGE PROCESSING DEVICE

CROSS-REFERENCE TO RELATED APPLICATIONS

The present application claims priority to and incorporates by reference the entire contents of Japanese priority document 2007-298730 filed in Japan on Nov. 17, 2007.

BACKGROUND OF THE INVENTION

1. Field of the Invention

The present invention relates to an image processing device that performs image processing of data for a target image having color information for each pixel and outputs the thus-processed data for an output image, and an image forming apparatus that performs image forming of the output image data.

2. Description of the Related Art

An image forming apparatus such as a copier, a facsimile, and a printer receives data described in a page description language (PDL) from a personal computer, etc. and processes the data in an image processing device. An example of such an image processing device is described in Japanese Patent Application Laid-open No. H9-168086. An image processing device generally performs half-tone processing such as gradation processing and dithering based on an error diffusion technique and a dither technique on input data (color image data) described in a PDL. This is for the following reason. In image data described in a PDL, color information is expressed in a tone value for each pixel. Furthermore, the color information is provided for each of the three primary colors (RGB or CMY). It is therefore difficult to individually and subtly control the amount of coloring material (e.g., ink or toner) consumed for each pixel in a color image to be formed by the image forming apparatus. This makes it difficult to perform half-tone processing in pixel units. Hence, in general image forming processes, color image data, in which half-tone is represented in pixel units, is converted through dithering into image data, in which half-tone is represented in units of an area made of a plurality of pixels.

By performing half-tone processing on color image data having color information for each pixel, the amount of data can be substantially reduced. To give a specific example, when each of the RGB (or CMY) colors is represented using 256 tones, each pixel is represented in a massive number of colors of 16,777,216 (256×256×256) colors. However, in this case, because 24 bits of information is required as color information for each pixel, the amount of image data to be processed will be extremely large, which is undesirable. Contrastingly, image data having undergone half-tone processing requires only indication as to whether each of colors (for example, CMY) is used for each pixel in the image to be outputted. It is therefore possible to substantially reduce the amount of data.

As described above, the amount of image data having undergone half-tone processing is small. Hence, by performing such image processing on image data, the amount of memory required for the image processing can be substantial reduced as compared to image processing carried out on image data the amount of which prior to being subjected to half-tone processing is large. However, it is possible that carrying out image processing on image data that has been subjected to half-tone processing is not appropriate for some type of the image processing. There can be even cases where carrying out image processing on image data having undergone half-tone processing results in failure.

As a specific example, image processing that draws a base image and thereafter performs masking such as watermarking on a predetermined region of the base image to obtain a final image will be described. Meanwhile, image data that has been subjected to half-tone processing is represented with a half-tone using a surface area ratio for each color of a pixel group comprised of a plurality of pixels. Accordingly, it is not possible to directly specify the color of each pixel of the base image from the image data for the image to be outputted. When, for example, image data in which commands and the like for carrying out image processing are described in a PDL is inputted, it is necessary to carry out the image processing on the image data prior to perform half-tone processing of the image data (image data having color information for each pixel). Examples of image processing that has to be carried out or is appropriate to be carried out on image data prior to being subjected to half-tone processing are not limited to masking.

As described above, because image data that has not yet been subjected to half-tone processing is large in the amount of data, a memory capacity required to perform image processing on such image data is increased. To this end, in recent years, resolution (for example, 1,200 dots per inch (dpi)) of image data (input data) to be subjected to image processing is temporarily dropped down to a lower resolution (for example, 600 dpi) in order to keep the memory capacity required for this image processing small. After the image data with the reduced resolution (low-resolution image data) is subjected to image processing, the resolution of this image data is increased to the resolution (for example, 1,200 dpi) of an image to be outputted. The memory capacity can therefore be reduced by an amount corresponding to the decrease in the resolution.

However, when the resolution has been dropped in this manner in the image processing, even if the resolution of the image data is attempted to be increased to the resolution of the image to be outputted after the image processing, the actual resolution remains to be low. Typically, the influence of the low resolution on the quality of pictorial images such as photographs, drawings, and patterns is comparatively small when viewed with eyes. In contrast, reducing the resolution to a small value is likely to cause the images to have apparent jaggedness, thereby substantially reducing the quality of images of characters such as Japanese characters, Chinese characters, alphabetic characters, and symbols when viewed with eyes in such a manner. Jaggy-smoothing technology that smoothes jaggy has been known, and an example of the technology is described in Japanese Patent Application Laid-open No. H9-168086. However, the known jaggy-smoothing technology has failed to sufficiently increase the quality of images of small-sized characters, etc. when viewed with eyes.

SUMMARY OF THE INVENTION

It is an object of the present invention to at least partially solve the problems in the conventional technology.

According to an aspect of the present invention, there is provided an image processing device including a color information plotting unit that acquires color information for each pixel by analyzing input image data and plots an image by using the color information, the image being an image of a character; a color information storage unit that stores therein the color information; a fine image plotting unit that generates low-resolution micropixel color information and high-resolution micropixel shape information by analyzing the input data; a micropixel shape information storage unit that stores therein the micropixel shape information; a micropixel color information storage unit that stores therein the micropixel color information; and a resolution-upconverting unit that performs resolution upconversion of image data based on the color information, the micropixel shape information, and the micropixel color information thereby obtaining high-resolution image data.

According to another aspect of the present invention, there is provided an image forming apparatus including the above image processing device that performs predetermined image processing on input image data, the input data having color information for each pixel, and outputs processed image data; and an image forming unit that forms an image based on the processed image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below in detail while referring to the accompanying drawings.

A first embodiment of the present invention relates to a full-color printer (hereinafter "printer"), which is an electrophotographic image forming apparatus, as an example of an image forming apparatus.

Figure 1:
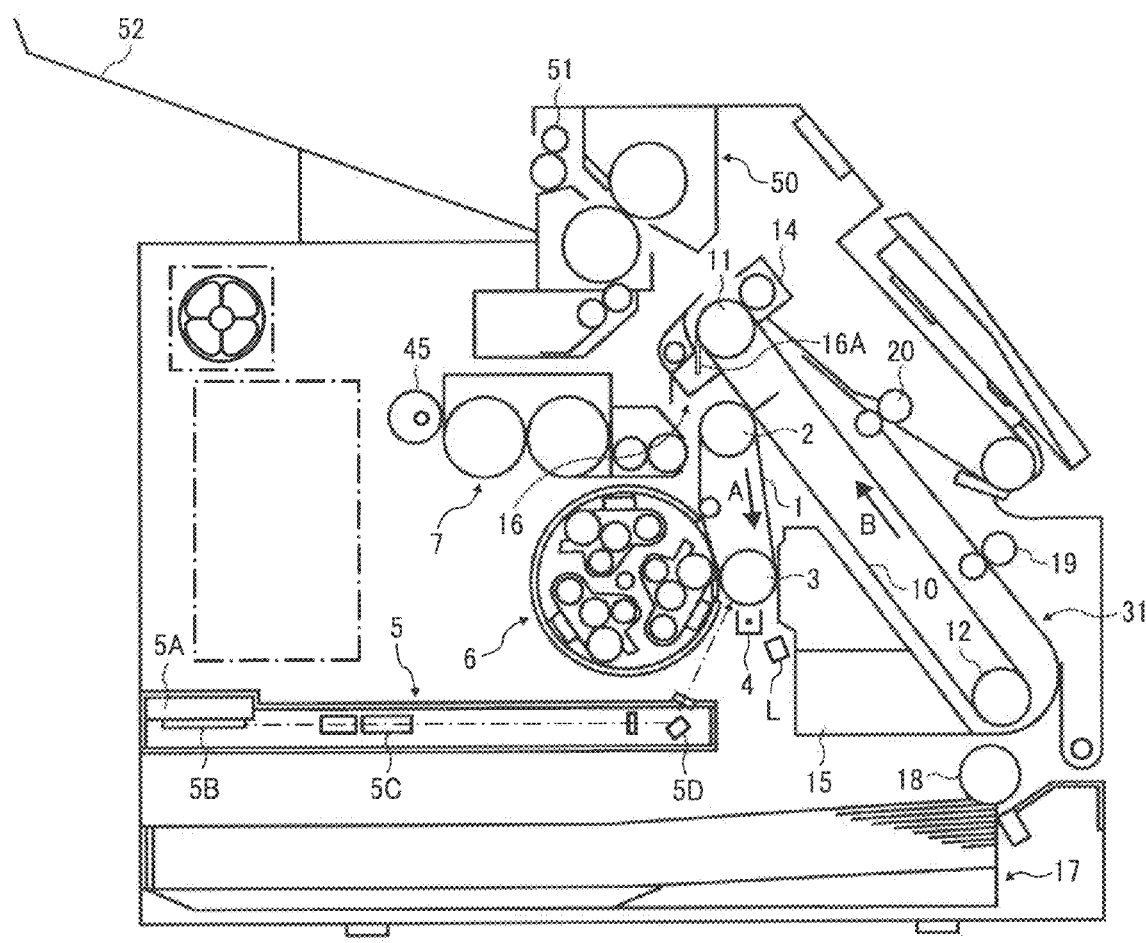
FIG. 1 is an outline view showing a printer according to an embodiment of the present invention.

First, the basic configuration of the printer of the embodiment is explained. FIG. 1 is an outline view showing the printer of the embodiment. As shown in FIG. 1, a photosensitive element 1, which is an image carrier embodied as an endless belt, is suspended around rollers 2 and 3. The photosensitive element 1 is endlessly driven in a clockwise direction on the plane of FIG. 1 by rotation of any one of the rollers 2 and 3.

A charging unit 4, a discharge lamp L, a cleaning unit 16, etc. are arranged around the periphery of the photosensitive element 1. The charging unit 4 uniformly charges the surface of the photosensitive element 1. The discharge lamp L is a discharging unit that removes remaining charge from the photosensitive element 1. The cleaning unit 16 cleans toner remaining after transfer on the surface of the photosensitive element 1.

An optical writing unit 5, which is a latent image writing unit, scans a portion of the photosensitive element 1 with laser light. The portion is on a downstream side from a position, at which the photosensitive element 1 is uniformly charged by the charging unit 4. As a result of this scanning, a potential of an exposure unit of the photosensitive element 1 is attenuated, thereby causing the photosensitive element 1 to carry a latent image thereon.

The photosensitive element 1 is positioned in a vertically-elongated orientation so as to take up space in a vertical direction rather than in a horizontal direction. A rotating developing unit 6 is provided to the left of the photosensitive element 1 in FIG. 1. The rotating developing unit 6 has a C-developer that uses cyan (C) toner, an M-developer using magenta (M) toner, and a Y-developer using yellow (Y) toner at positions spaced from each other at angular intervals of approximately 120 degrees on a holder rotatable about a rotary axis. By rotating the holder, any one of the developers can be moved to a developing position at which the developer faces the photosensitive element 1. Accordingly, a developing color to be used for development of an electrostatic latent image on the photosensitive element 1 can be switched over to any one of C, M, and Y. It is therefore possible to form a C-toner image, an M-toner image, and a Y-toner image on the photosensitive element 1 by sequentially switching over the developer used in development from one to another. It is also possible not to cause the rotating developing unit 6 to perform development by rotating the holder to a position, at which none of the developers can perform development.

A black (Bk) developing unit 7 that performs development using Bk toner is arranged above the rotating developing unit 6 in FIG. 1. A Bk-toner image can then be obtained by developing the electrostatic latent image on the photosensitive element 1 using Bk toner. The Bk developing unit 7 is allowed to reciprocate between a position where developing of an electrostatic latent image on the photosensitive element 1 is possible and a position where developing is not possible. This reciprocal movement is achieved by an urging means such as a spring that urges the Bk developing unit in a direction away from the photosensitive element 1 and by a construction that causes the Bk developing unit 7 to abut on a cam surface of a rotatable cam 45.

The optical writing unit 5 causes laser light irradiated from a light source, such as a semiconductor laser (not shown), to be deflected in a main scanning direction (direction along a photosensitive element axis) by causing the laser light to be reflected from a mirror surface based on the image data. The mirror surface is a side surface of a regular-polygonal columnar mirror 5B rotated by a polygon motor 5A. By causing light to pass through an fθ lens 5C and to be reflected from a reflecting mirror 5D to thereby reach the surface of the photosensitive element 1, the surface of the photosensitive element 1 is scanned with the light.

A transfer unit is provided to the right of the photosensitive element 1 in the drawing. At the transfer unit, an endless intermediate transfer belt 10 is wound around rollers 11 and 12. The intermediate transfer belt 10 can be moved in either one of an anticlockwise direction and a clockwise direction in FIG. 1 by being rotated by either one of the rollers 11 and 12. At the transfer unit, a working surface of the intermediate transfer belt 10 comes into contact with a working surface of the photosensitive element 1 so as to form a primary transfer nip. A primary transferring unit such as a transfer brush comes into contact with or near a portion of an intermediate transfer belt on a side opposite from the working surface of the primary transfer nip. A primary transfer electric field is formed within the primary transfer nip by the primary transferring unit. The primary transfer electric field causes toner of the toner images formed on the photosensitive element 1 to electrostatically move from the side of the photosensitive element 1 to the side of the intermediate transfer belt 10. Thus, the toner image formed on the photosensitive element 1 is primary-transferred onto the intermediate transfer belt 10 by the action of the primary transfer electric field and a pressure applied at the nip.

First, an electrostatic latent image for development using C toner is formed on the surface of the photosensitive element 1 by optical scanning performed by the optical writing unit 5. This electrostatic latent image is developed by the C-developer of the rotating developing unit 6 to give a C-toner image. The Bk developing unit 7 is retracted to a position where the Bk developing unit 7 cannot perform development during this process. The C-toner image developed on the photosensitive element 1 is then primary-transferred onto the intermediate transfer belt 10 at the primary transfer nip.

When optical scanning for forming an electrostatic latent image for development using C toner is completed, writing of an electrostatic latent image for development using M toner is started by the optical writing unit 5. After a trail end of the electrostatic latent image for development using C toner on the photosensitive element 1 has passed through a facing position at which the image faces the rotating developing unit 6, the holder of the rotating developing unit 6 is rotated through 120 degrees over a period until a leading end of the electrostatic latent image for development using M toner on the photosensitive element 1 reaches the facing position. The M-developer of the rotating developing unit 6 therefore moves to the developing position at which the electrostatic latent image can be developed using M toner. The M-toner image developed on the photosensitive element 1 is then primary-transferred so as to be overlaid on the C-toner image on the intermediate transfer belt 10 at the primary transfer nip.

When optical scanning for forming the electrostatic latent image for development using M toner is completed, writing of an electrostatic latent image for development using Y toner is started by the optical writing unit 5. After a trail end of the electrostatic latent image for development using M toner on the photosensitive element 1 has passed through a facing position at which the image faces the rotating developing unit 6, the holder of the rotating developing unit 6 is rotated through 120 degrees over a period until a leading end of the electrostatic latent image for development using Y toner on the photosensitive element 1 reaches the facing position. The Y-developer of the rotating developing unit 6 therefore moves to a developing position at which the electrostatic latent image can be developed using Y toner. The C-toner image developed on the photosensitive element 1 is then primary-transferred so as to be overlaid on the C-toner image and M-toner image on the intermediate transfer belt 10 at the primary transfer nip.

It is possible to reproduce black by overlaying the three colors of C, M, and Y on one another. However, because the frequency of output of which is high, reproduction of black is performed by using black toner in this printer rather than by overlaying the three colors on one another. As a result, when optical scanning for forming an electrostatic latent image for development using Y toner is completed, writing of an electrostatic latent image for development using K toner is started by optical scanning of the optical writing unit 5. After a trail end of the electrostatic latent image for development using Y toner on the photosensitive element 1 has passed through a facing position at which the image faces the rotating developing unit 6, the holder of the rotating developing unit 6 is rotated through 60 degrees over a period until a leading end of the electrostatic latent image for development using Bk toner on the photosensitive element 1 reaches the facing position. At substantially the same time, the Bk developing unit 7 is moved to a position where developing is possible by rotation of the rotatable cam 45. Developing processing by the rotating developing unit 6 is therefore stopped and developing by the Bk developing unit 7 becomes possible. The Bk toner image developed on the photosensitive element 1 is then primary-transferred at the primary transfer nip so as to be overlaid on the C-, M-, and Y-toner images on the intermediate transfer belt 10.

The transfer unit has a secondary transfer unit 14 including a secondary transfer roller, etc. on the outside of a loop of the intermediate transfer belt 10. The secondary transfer unit 14 is arranged so as to abut with or be close to a position at which the intermediate transfer belt 10 is wound around the roller 11 so as to form a secondary transfer position. By this construction, a secondary transfer electric field that causes toner images of the four colors overlaid on one another on the intermediate transfer belt 10 at the secondary transfer position to electrostatically move from the intermediate transfer belt 10 to the secondary transfer unit 14 is formed.

A paper feed cassette 17 for storing a plurality of sheets of recording paper in a stacked state is provided at the lowermost part of the printer. The uppermost recording sheet is then fed to a paper feed path 31 by rotation of a paper feed roller 18. The thus-fed recording paper is then conveyed while being sandwiched at a conveying nip of a pair of conveying rollers 19 arranged within the paper feed path 31. The recording paper then reaches a pair of registration rollers 20 provided near a downstream end of the paper feed path 31. When a leading end of the recording paper is sandwiched at a registration nip between the pair of registration rollers 20, the registration rollers 20 temporarily stops rotating. Rotation of both rollers is then recommenced at a time when the recording paper is superimposed on the toner images of the four colors superimposed on the intermediate transfer belt 10 to send the recording paper toward the secondary transfer position.

The toner images of the four colors superimposed on the intermediate transfer belt 10 are brought into close contact with the recording paper at the secondary transfer position and collectively secondary-transferred by the action of the secondary transfer electric field.

Toner that is not secondary transferred to the recording paper remains on the intermediate transfer belt 10 after the secondary transfer processing. The remaining transfer toner is then removed by a cleaning blade 16A of the cleaning unit 16 being in contact with the intermediate transfer belt 10 on a downstream side in the direction of movement of the belt 10 from the secondary transfer position.

At the primary transfer step for causing toner images to be superimposed, the intermediate transfer belt 10 is rotated at least four times to form the toner images of the four colors on the intermediate transfer belt 10. When the cleaning blade 16A comes into contact with the intermediate transfer belt 10 being rotated, the toner image of each color that has been primary-transferred onto the intermediate transfer belt 10 in unintentionally removed from the surface of the belt by the cleaning blade 16A. Consequently, the superimposed toner images of the four colors can no longer be obtained. To this end, the printer has a retracting mechanism (not shown) that causes the cleaning unit 16 to move between a cleaning position at which the cleaning blade 16A is in contact with the belt 10 and a retraction position at which the cleaning blade 16A is away from the belt 10. At the primary transfer step for causing toner images to be superimposed, the cleaning unit 16 is retracted to the retraction position. When a device that comes into contact with the intermediate transfer belt 10 to form a secondary transfer nip is used as the secondary transfer unit 14, a retracting mechanism is also required to move the secondary transfer unit 14 away from the belt 10 during the primary transfer step in order to prevent transfer of the toner images from the intermediate transfer belt 10 to the secondary transfer unit 14.

Recording paper with a full color image formed thereon as a result of collective secondary transfer of superimposed toner images of four colors at the secondary transfer position is sent to a fixing unit 50 and a full-color image is fixed. The recording paper is then ejected to the outside via a discharge nip between a pair of discharging rollers 51. The recording paper is then stacked on a stack unit 52 formed outside the casing.

Remaining toner is scraped from the surface of the intermediate transfer belt 10 by the cleaning unit 16 and then dropped into a recovery container 15 provided below the cleaning unit 16 in the gravitational direction.

Figure 2:
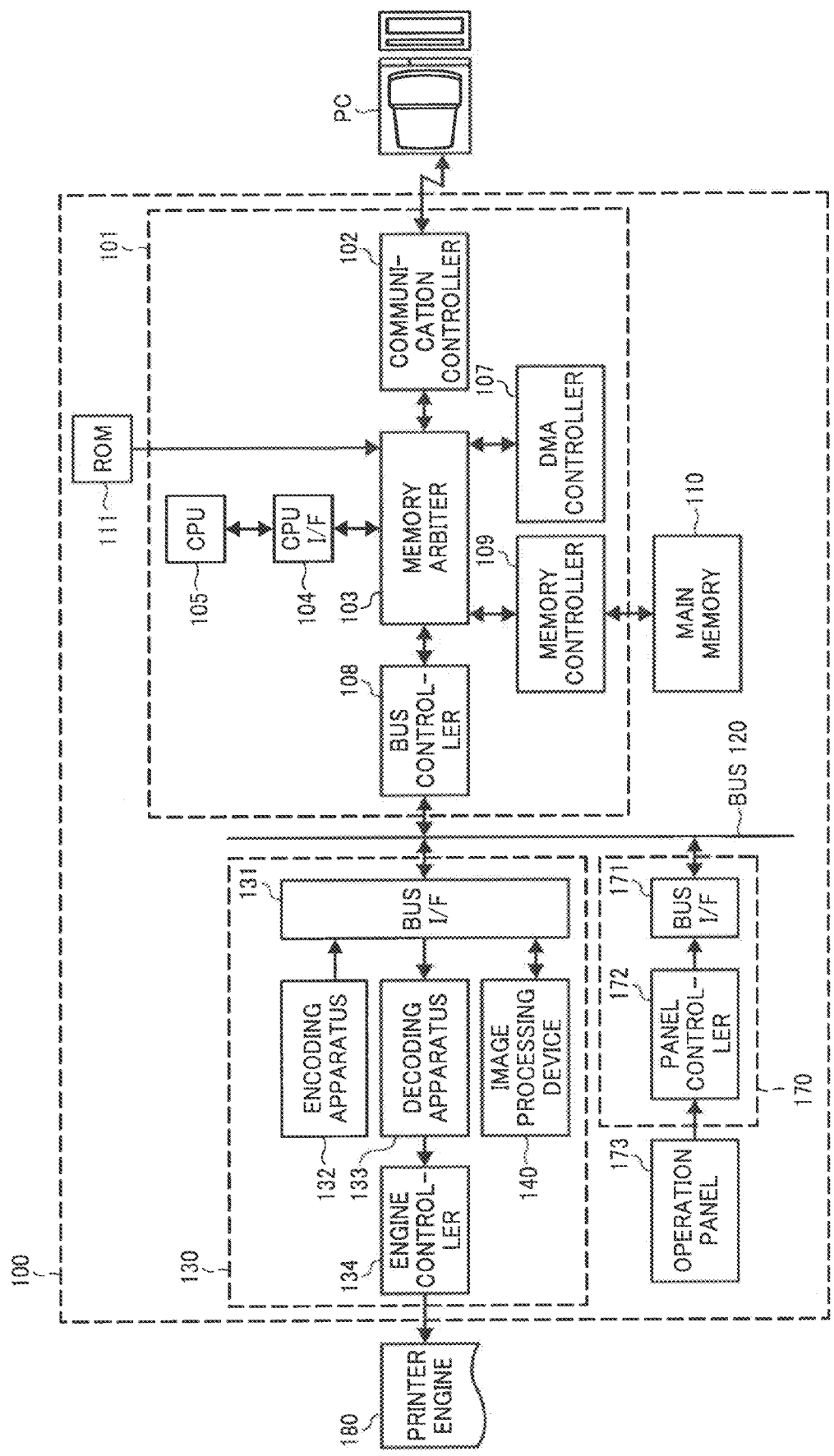
FIG. 2 is a block diagram showing an electrical unit of the printer shown in FIG. 1 together with a personal computer.

FIG. 2 is a block diagram showing an electrical unit 100 of this printer together with a personal computer (hereafter, "PC"), which is external equipment. In FIG. 2, a central control apparatus 101 that controls the entire printer has a communication controller 102, which is an input unit, a memory arbiter 103, a central processing unit (CPU) interface (I/F) 104, a CPU 105, a direct memory access (DMA) controller 107, a bus controller 108, and a memory controller 109, etc.

The communication controller 102 can communicate with the PC via a network cable, a printer cable, a USB cable, a wireless LAN, etc. The thus received data is temporarily stored in a main memory 110 via the memory arbiter 103 and the memory controller 109.

The memory arbiter 103 arbitrates between the main memory 110 functioning as a color information storage unit, a micropixel shape information storage unit, and a storage unit and various controllers. The CPU 105 is connected to the memory arbiter 103 via the CPU I/F 104. The CPU 105 receives data described in a PDL from the PC and analyzes the data to generate necessary parameters for image processing. The DMA controller 107 carries out direct memory access with an engine controller 134 connected to the central control apparatus 101 via the memory controller 109 and a bus 120, etc. The bus controller 108 arbitrates with various devices connected via the bus 120.

The bus 120, a read only memory (ROM) 111, the main memory 110, etc. are connected to the central control apparatus 101. Various programs and font information for characters etc. stored in the ROM 111 are supplied to the CPU 105 and the bus 120 via the memory arbiter 103 as necessary. A bus I/F 131 of a main control apparatus 130, a bus I/F 171 of a panel control apparatus 170, and the central control apparatus 101 are connected to the bus 120.

At the panel control apparatus 170, a panel controller 172 that controls an operation panel 173 is connected to the central control apparatus 101 via the bus I/F 171 and the bus 120. The operation panel 173 includes various numeric key pads, a liquid crystal display, etc.

In the main control apparatus 130, an encoding apparatus 132, a decoding apparatus 133, and an image processing device 140 are connected to the bus I/F 131 while being connected to the central control apparatus 101 via the bus I/F 131 and the bus 120. The engine controller 134 is connected to the decoding apparatus 133. A printer engine 180 is connected to the engine controller 134. The image processing device 140 processes color image data (input data) described in a PDL and writes the data in the main memory 110 based on image processing parameters generated by the CPU 105. The encoding apparatus 132 encodes image data having been processed and written in the main memory 110 by the image processing device 140. The decoding apparatus 133 decodes data encoded by the encoding apparatus 132 and sends the data to the engine controller 134.

In the following explanation, a resolution of color image data (input data) described in a PDL is assumed to be 1,200 dpi.

Figure 3:
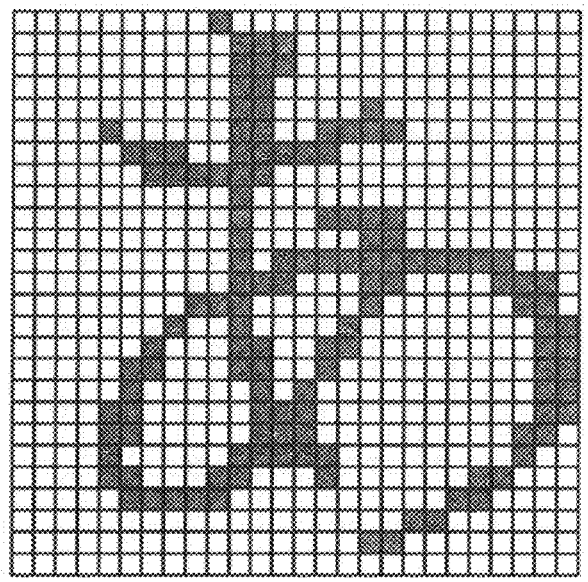
FIG. 3 is a diagram of a Japanese character plotted at a resolution of 1,200 dpi on a 1,200×1,200 pixel matrix.

FIG. 3 is a diagram where an image of a Japanese character of a resolution of 1,200 dpi is depicted on a 1,200×1,200 pixel matrix.

In FIG. 3, because the character is shown in an enlarged manner, the image appears to be coarse; however, in an actual size, the image quality is so high as to assume an extremely smooth shape in a sufficient smoothness even when the size of the character is small.

Figure 4:
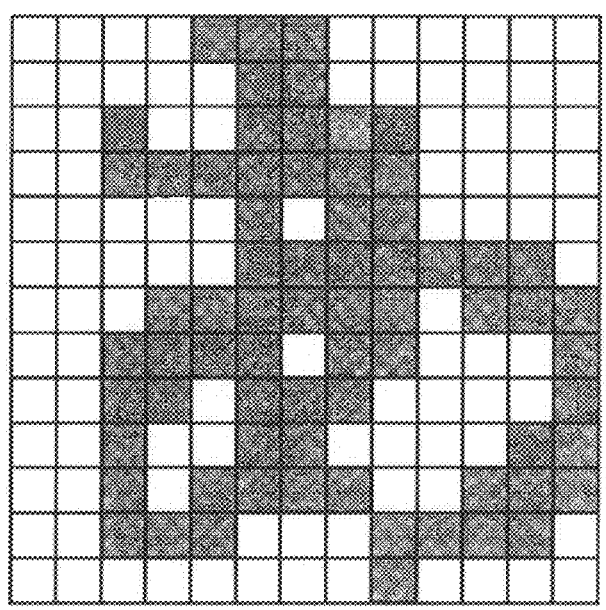
FIG. 4 is a diagram of the same Japanese character plotted in FIG. 3 but this time plotted at a resolution of 600 dpi on a 600×600 pixel matrix.

FIG. 4 is a diagram where an image of the same Japanese character shown in FIG. 3 is depicted but this a resolution of 600 dpi is depicted on a 600×600 pixel matrix.

As shown in FIG. 4, when the resolution is lowered to 600 dpi, jaggy of the character becomes apparent. As a result, particularly for small characters, obtaining high image quality, is so difficult as to make even identification of the character difficult.

Next, image processing according to the embodiment will be described.

Figure 5:
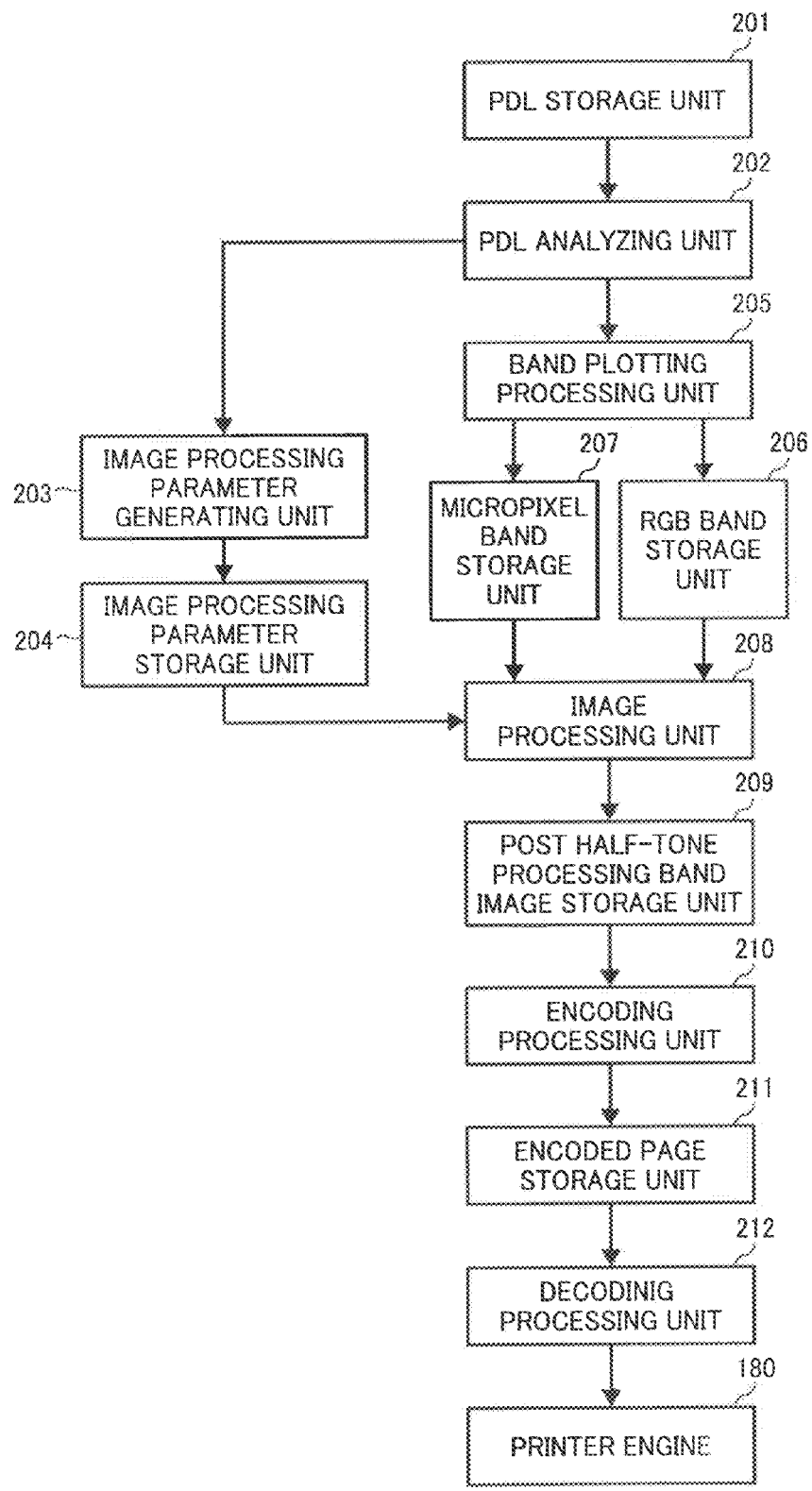
FIG. 5 is a function block diagram for explaining an entire flow of image processing.

FIG. 5 is a block diagram of functions expressed along the flow of the image processing as a whole.

Figure 6:
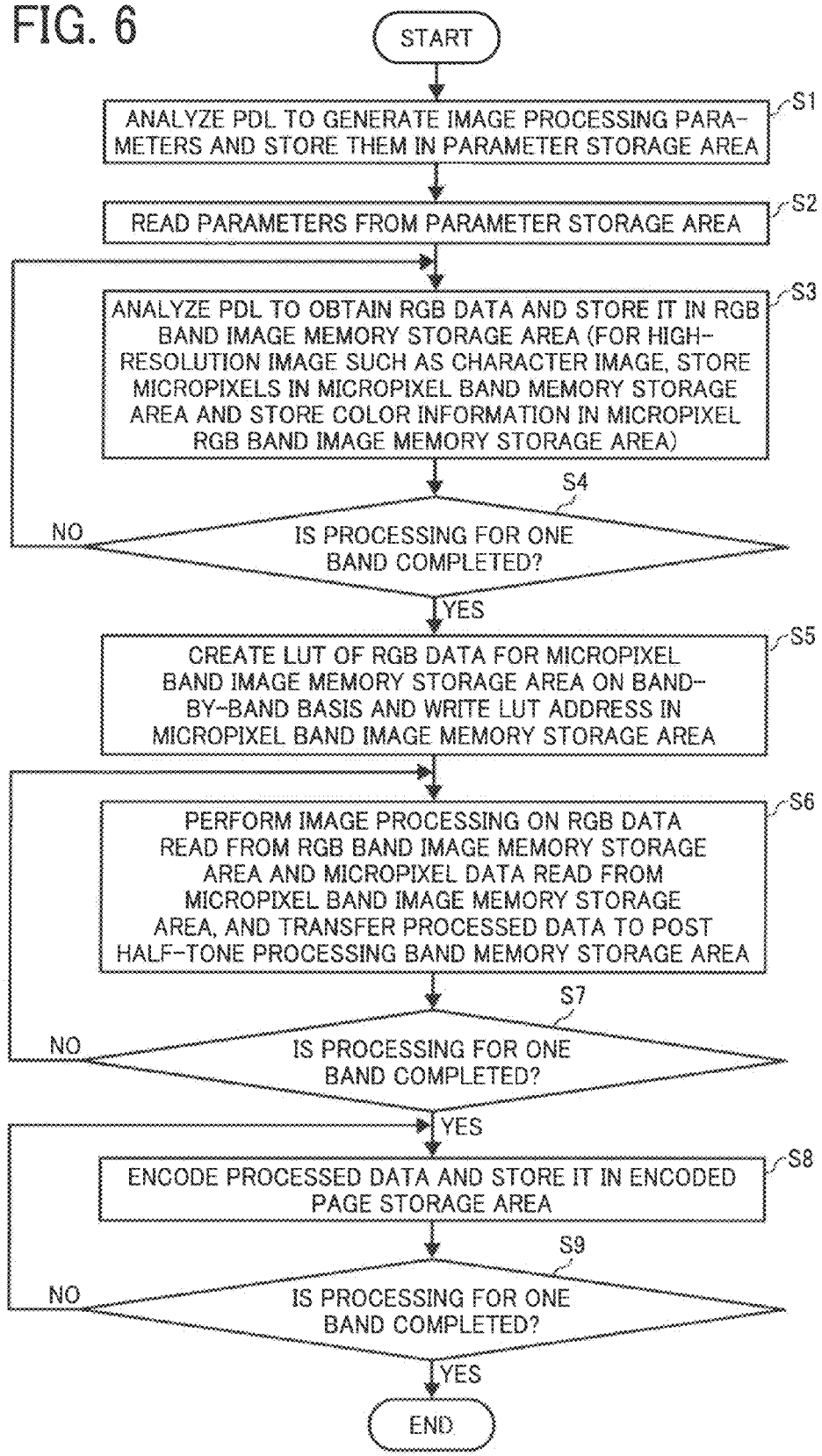
FIG. 6 is a flowchart of the entire flow of the image processing shown in FIG. 5.

FIG. 6 is a flowchart showing the flow of the image processing as a whole.

Figure 7:
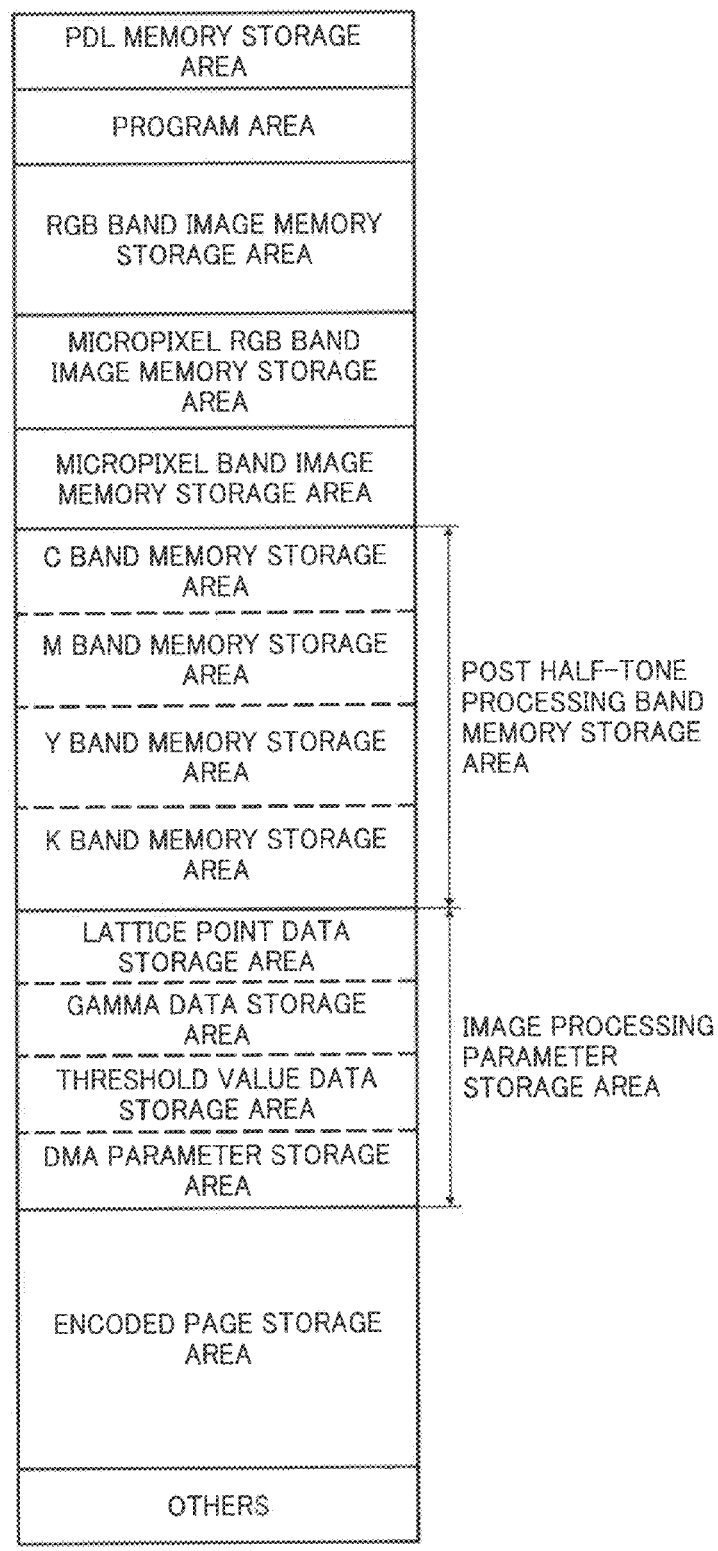
FIG. 7 is a schematic diagram of data areas in a main memory in the electrical unit shown in FIG. 2.

FIG. 7 is a view illustrating various data areas in the main memory 110.

Figure 8:
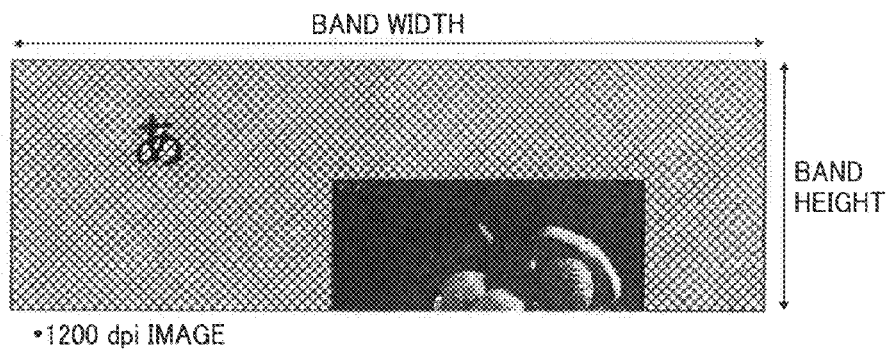
FIG. 8 is a schematic diagram of only one band of a 1,200 dpi input image (image to be subjected to the processing shown in FIG. 6) based on PDL data.

FIG. 8 is a diagram showing only one band of an example input image (to be subjected to image processing) of 1,200 dpi based on PDL data.

PDL data is received by the communication controller 102. A PDL storage unit 201 temporarily stores the PDL data in a PDL memory storage area in the main memory 110 via the memory arbiter 103 and the memory controller 109. In this embodiment, the thus-received PDL data is data for a 1,200 dpi input image (image to be subjected to processing) having RGB data (color information) of 24 bits (R=8 bits, G=8 bits, B=8 bits) for each pixel.

A PDL analyzing unit 202 analyzes the PDL data that is temporarily stored in the PDL memory storage area in the main memory 110 by the CPU 105.

At an image processing parameter generating unit 203 the CPU 105 generates various image processing parameters necessary for the image processing device 140 to carry out image processing based on the result of analysis performed by the PDL analyzing unit 202. Specifically, the parameter generating unit 203 generates image processing parameters such as lattice point data, gamma data, threshold value data, and DMA parameters.

An image processing parameter storage unit 204 stores the various image processing parameters generated by the image processing parameter generating unit 203 in corresponding storage areas in an image processing parameter storage area in the main memory 110 (Step S1). Thereafter, an image processing unit 208 reads a required one(s) of various image processing parameters from a corresponding storage area(s) in the image processing parameter storage area (Step S2).

A band plotting processing unit 205 and an RGB band storage unit 206 plot onto the main memory 110 only one band of an input image (image to be subjected to processing) having RGB data (color information) based on PDL data according to the result of analysis performed by the PDL analyzing unit 202.

Figure 9A:
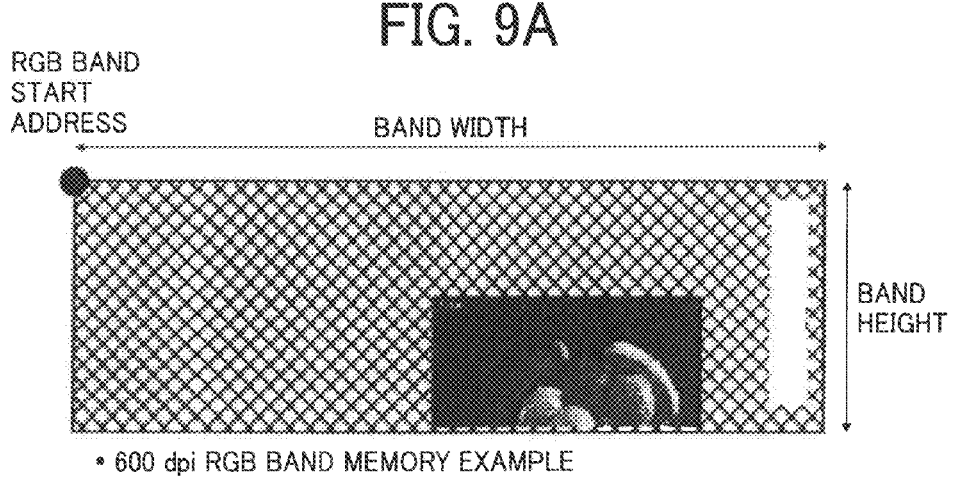
FIG. 9A is a schematic diagram of an image plotted on an RGB band image memory storage area in the main memory shown in FIG. 7.
Figure 9B:
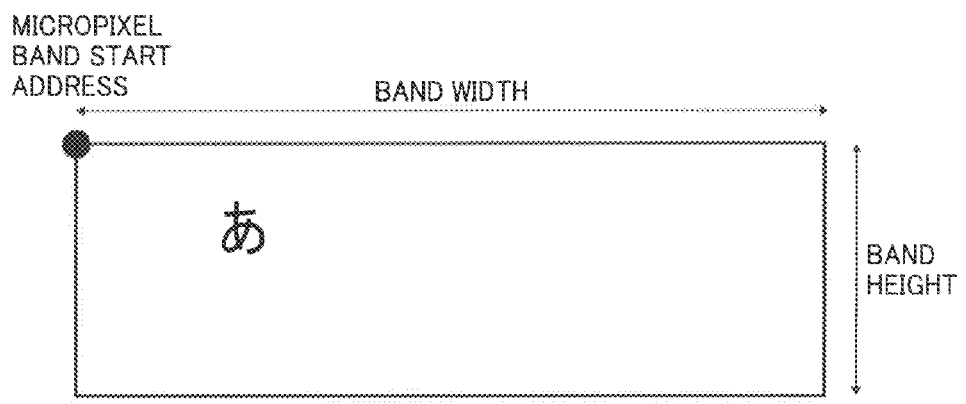
FIG. 9B is a schematic diagram of a portion of a character image corresponding to the image shown in FIG. 9A.

Specifically, the band plotting processing unit 205, which is a color information plotting unit, a resolution-downconverting unit, and a first color information processing unit, and the RGB band storage unit 206 perform resolution-downconverting processing as follows. First, the band plotting processing unit 205 plots 24-bit RGB data (first color information) for each of low-resolution (600 dpi) pixels (corresponding to 2×2 micropixels (1,200 dpi)) at a resolution (600 dpi) lower than a resolution (1,200 dpi) of an output image. The RGB band storage unit 206 stores the data in an RGB band image memory storage area in the main memory 110. An example image plotted on the RGB band image memory storage area in the main memory 110 as described above is shown in FIG. 9A. A start address for the image in the RGB band image memory storage area is an RGB band start address. As shown in FIG. 9A, a character image is not stored in the RGB band image memory storage area. FIG. 9B is a view of the character image on an assumption that it is depicted. A start address for the character image in the micropixel band image memory storage area is a micropixel band start address.

Figure 10:
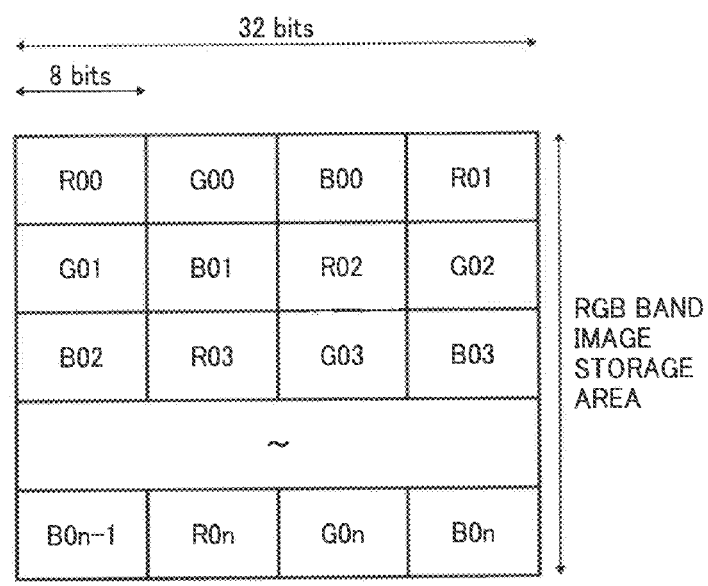
FIG. 10 is an explanatory diagram of a memory format for the RGB band image memory storage area in the main memory shown in FIG. 9A.

FIG. 10 is a diagram for explaining a memory format for the RGB band image memory storage area in the main memory 110. As shown in FIG. 10, 24-bit (R=8 bits, G=8 bits, B=8 bits) RGB data is stored consecutively in the order of the pixel numbers (00 to 0n) within the RGB band image memory storage area.

The band plotting processing unit 205 and a micropixel band storage unit 207 write attribute data for only one band of a character image region (specific image region) in the main memory 110 (Steps S3, S4).

Specifically, first, the band plotting processing unit 205, which functions as a specific image region detection unit, detects and recognizes a character image region (specific image region) in the input image based on the result of analysis performed by the PDL analyzing unit 202. The character image region is a predetermined region that includes a character image (specific image) and a background image other than the character image. The character image region is specified based on the PDL data. In the resolution-downconverting processing, the RGB data for the background image (first color information) is already plotted on the RGB band image memory storage area in the main memory 110.

The band plotting processing unit 205 carries out the following processing on the thus-recognized character image region.

First, the band plotting processing unit 205, which functions as a plotting unit, plots (develops) onto a temporary storage area (not shown) in the main memory 110 RGB data for each of micropixels (pixels of a resolution of an input image) while retaining a resolution (1,200 dpi) of an input image (hereinafter, "input resolution"). Thereafter, the band plotting processing unit 205, which functions as a fine image plotting unit and a shape information processing unit, analyzes the data plotted on the temporary storage area in the main memory 110. The band plotting processing unit 205 generates layout pattern data (shape information) indicating an internal arrangement of the low-resolution pixels (2×2 micropixels) for the character-constituting micropixels (specific pixels of the input resolution) constituting the character image of the micropixels. The micropixel band storage unit 207 stores the layout pattern data generated by the band plotting processing unit 205 in a micropixel band image memory storage area in the main memory 110.

Figure 11:
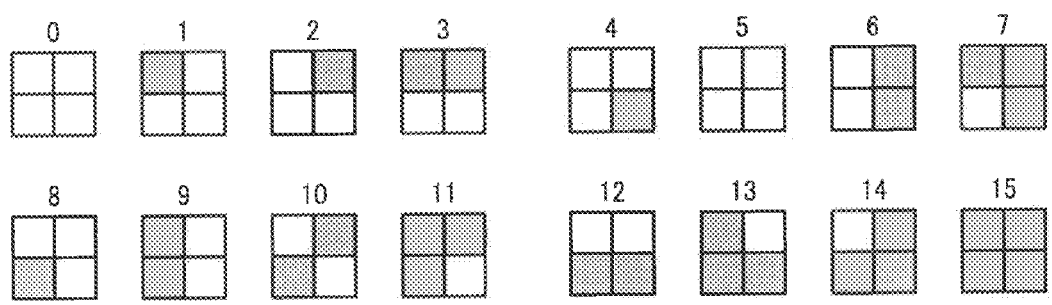
FIG. 11 is an explanatory diagram of layout pattern data.

FIG. 11 is a diagram for describing the layout pattern data.

In this embodiment, one low-resolution pixel of the low-resolution image is configured of 2×2 micropixels (pixels of a resolution of an input image) so that a 1,200 dpi input image can be converted into a low-resolution image of 600 dpi. An arrangement pattern for character-constituting micropixels within one low-resolution pixel (2×2 micropixels) has sixteen possibilities in total, as shown in FIG. 11. Portions shown in gray in FIG. 11 are character-constituting micropixels. The amount of information required to identify sixteen arrangement patterns is 4-bits. Accordingly, in this embodiment, the layout pattern data is taken to be 4-bit data. The 4-bit pattern data is stored in the micropixel band image memory storage area in the main memory 110.

Because plotting is performed at 1,200 dpi in this scheme, this scheme requires a larger area of memory is required than a scheme in which plotting is performed at 600 dpi. However, plotting at the input resolution of 1200 dpi is performed only for the character image region of the input image. The necessary memory area can therefore be small as compared to a scheme of plotting the entire input image at the input resolution. Furthermore, the need of plotting data on the memory area at 1,200 dpi arises only when the layout pattern data needs to be generated. Accordingly, the data of 1,200 dpi can be deleted after generation of the layout pattern data. It is therefore not necessary to prepare a dedicated memory area in order to perform plotting at the input resolution of 1,200 dpi, and in many cases, an increase in memory area of the main memory 110 is not required.

The band plotting processing unit 205, which functions as a second color information processing unit, generates RGB data (second color information) corresponding to colors of the character image based on the PDL data for each of low-resolution (600 dpi) pixels (2×2 micropixels) of the character image region. The micropixel band storage unit 207 stores the RGB data generated by the band plotting processing unit 205 in the micropixel band image memory storage area in the main memory 110.

When, for one band, each of RGB data (24-bit) for the non-character image region, layout pattern data (4-bit) for the character image region, and RGB data (24-bit) for the character-constituting micropixels of the character image region has been stored in the corresponding storage area in the main memory 110, the micropixel band storage unit 207 generates a look up table (LUT) for the colors of the character-constituting micropixels (Step S5).

Specifically, first, the micropixel band storage unit 207 stores RGB data indicating the colors of the character-constituting micropixel, which are stored temporarily in the micropixel RGB band image memory storage area in the main memory 110, in the micropixel RGB band image memory storage area using an LUT method. When character-constituting micropixels of different colors are included within one band, RGB data pieces of the number of the colors are entered in the LUT. Typically, a maximum number of colors for the character image data is sixteen or a like. An LUT address is therefore taken as 4-bit data in this embodiment.

Figure 12:
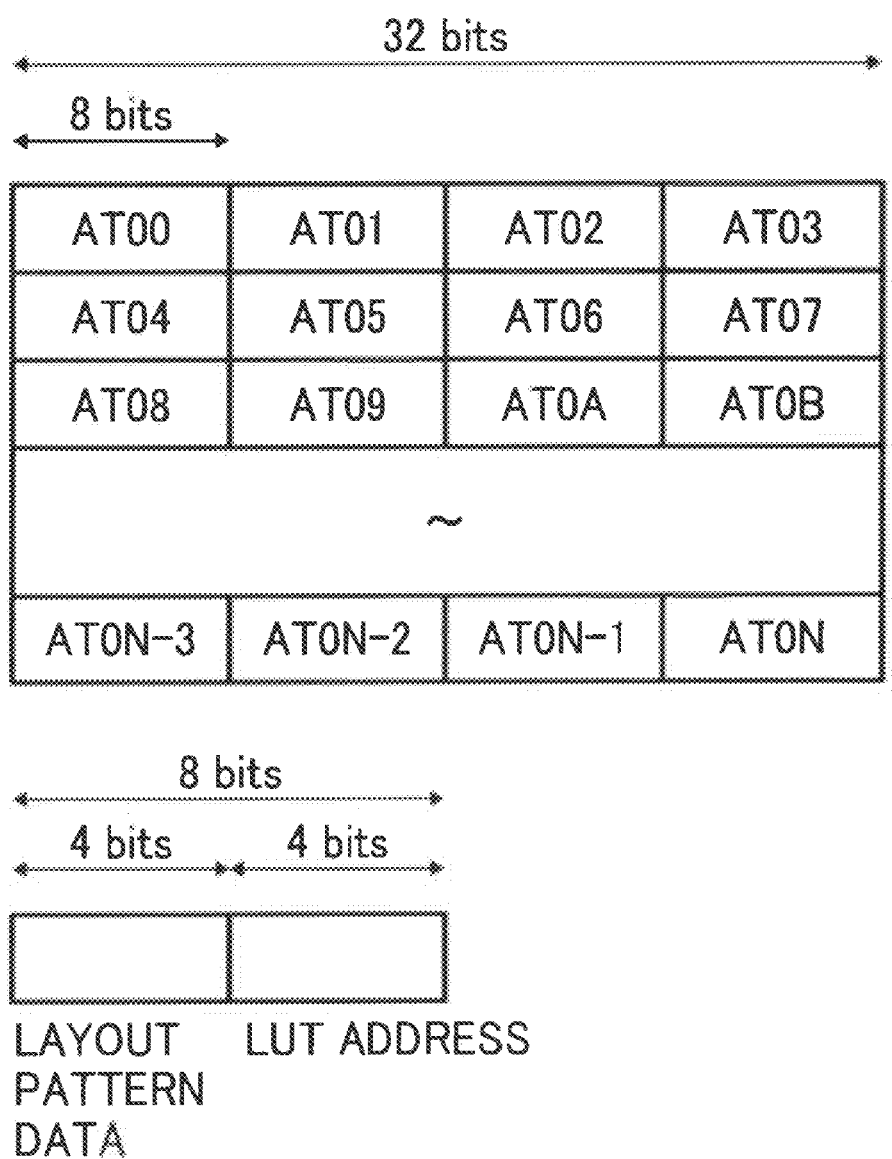
FIG. 12 is an explanatory diagram of a memory format for a micropixel band image memory storage area in the main memory shown in FIG. 7.

If an LUT is generated in this manner, the micropixel band storage unit 207 stores LUT addresses corresponding to colors of the character-constituting micropixels for each low-resolution pixel (2×2 micropixel) in a state of being correlated with layout pattern data corresponding to the low-resolution pixels within the micropixel band image memory storage area in the main memory 110. Specifically, the micropixel band storage unit 207 stores the LUT addresses in accordance with the memory format within the micropixel band image memory storage area in the main memory 110. In this embodiment, as shown in FIG. 12, 8-bit attribute data (4 bits of layout pattern data and 4 bits of LUT address) is stored consecutively on a pixel-by-pixel basis in the order of pixels numbers (00 to 0n) within the micropixel band image memory storage area.

Figure 13:
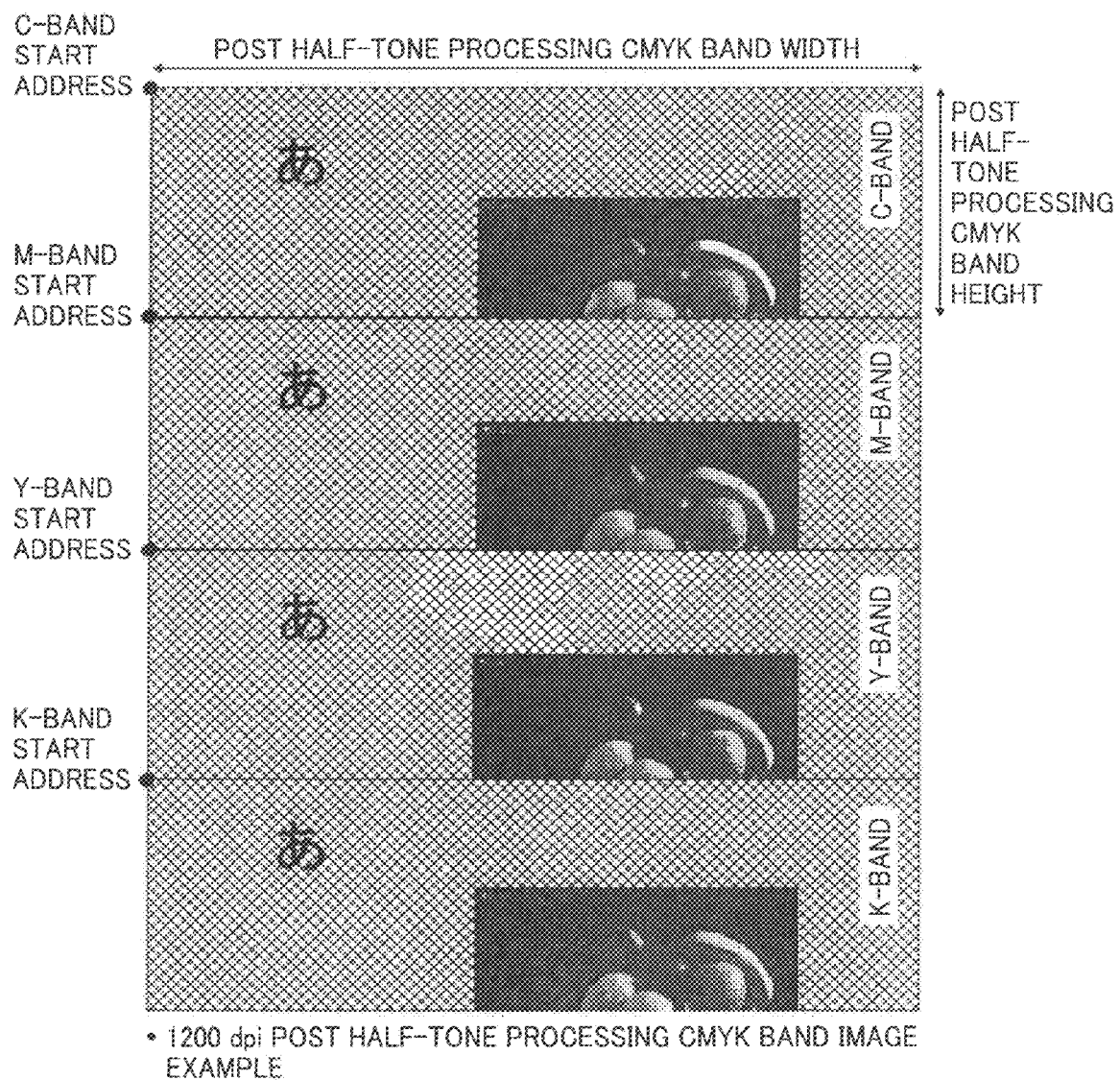
FIG. 13 is an explanatory diagram of C-, M-, Y-, and K-images stored in a post half-tone processing band memory storage area in the main memory shown in FIG. 7.

At the image processing unit 208, first, the image processing device 140 receives image processing parameters from the image processing parameter storage area in the main memory 110. The image processing device 140 also reads in the RGB data from the RGB band image memory storage area in the main memory 110 and reads in the attribute data (layout pattern data and LUT addresses) for the character image regions from the micropixel band image memory storage area in the main memory 110. The image processing device 140 then performs half-tone processing (dithering, etc.) on the one band. The low-resolution (600 dpi) image having 24 bits of RGB data for each pixel is then converted to C, M, Y, and K image data. Because a widely used, known method can be employed as the half-tone processing, detailed description thereof is omitted. A post half-tone processing band image storage unit 209 stores the C, M, Y and K image data having undergone half-tone processing in corresponding areas in a post half-tone processing band memory storage area in the main memory 110 (Steps S6, S7). Each of the C-, M-, Y-, and K-images stored in the post half-tone processing band memory storage area in the main memory 110 at this time are shown in FIG. 13. Start addresses for the C-, M-, Y-, and K-images in the C band memory storage area, the M band memory storage area, the Y band memory storage area, and the K band memory storage area are a C-band start address, an M-band start address, a Y-band start address, and a K-band start address, respectively.

At an encoding processing unit 210, the encoding apparatus 132 reads in and encodes the C, M, Y and K image data, for the one band, stored in the corresponding areas in the post half-tone processing band memory storage area in the main memory 110 and sends the encoded data to the main memory 110 (Steps S8, S9). An encoded page storage unit 211 then stores the encoded data in a encoded page storage area in the main memory 110 on a page-by-page basis.

After the above processing for data of at least one page is completed, at a decoding processing unit 212, the decoding apparatus 133 reads out encoded data of one page stored in the encoded page storage area in the main memory 110, decodes the data, and transfers the decoded data to the engine controller 134. The engine controller 134 controls the printer engine 180 based on the decoded image data (output image data) and carries out image forming processing of the data.

Figure 14:
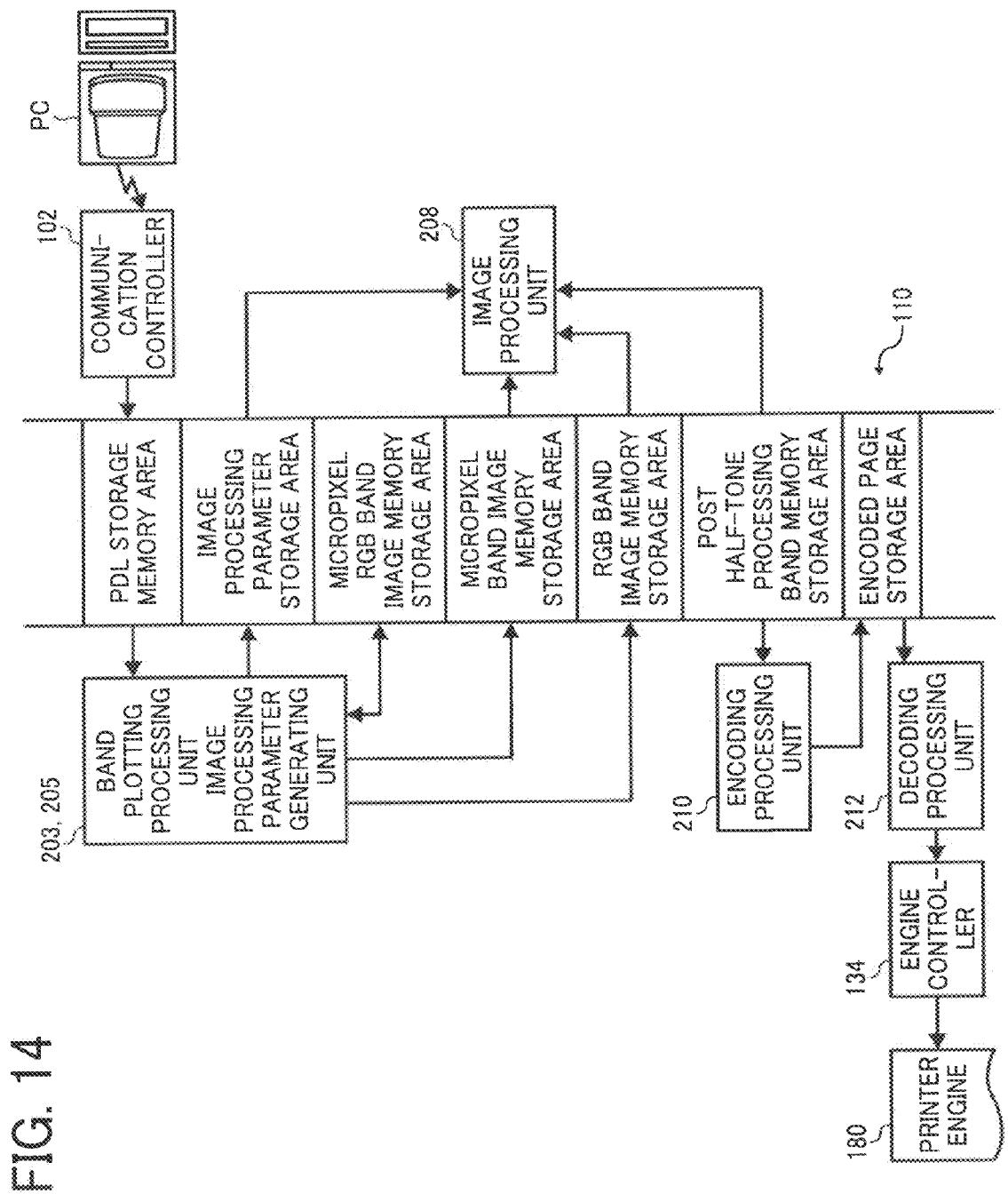
FIG. 14 is an explanatory diagram of the entire flow of the image processing shown in FIG. 5 centered on reading from and writing to the main memory.

FIG. 14 is a diagram depicting the flow of the processes explained above centered on reading from and writing to the main memory 110.

Image processing for the character image region, which is a characteristic portion of the present invention, will be described in detail.

Image processing is carried out mainly by the central control apparatus 101 that processes the data by using its attribute data, which is 24-bit RGB data, without making modification thereto.

Figure 15B:
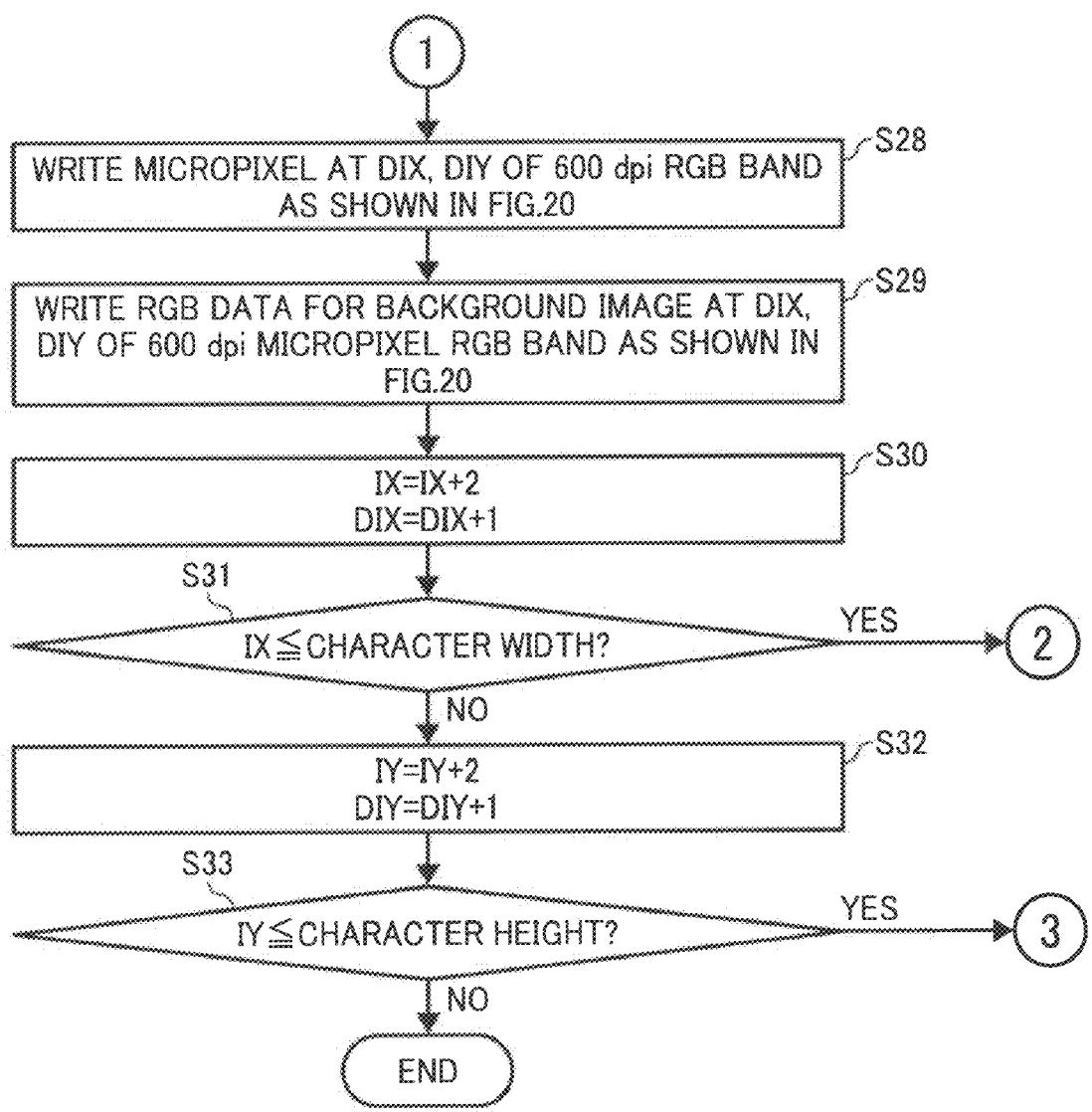
FIG. 15 is a flowchart of the relevant portion for the character image region of the flow of the image processing shown in FIG. 6.
Figure 16A:
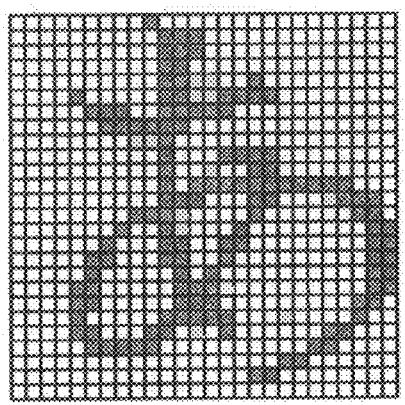
FIGS. 16A to 16E are diagrams for explaining the image processing performed on a character image region.
Figure 16B:
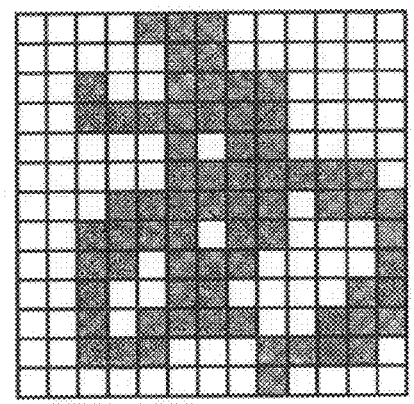
Figure 16C:
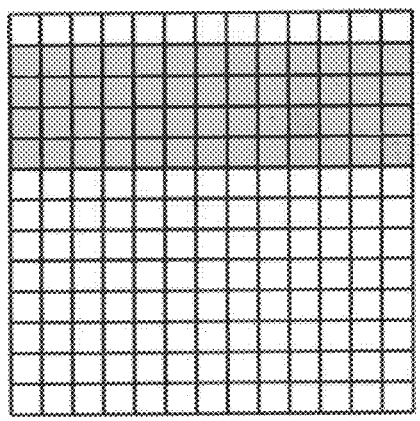
Figure 16D:
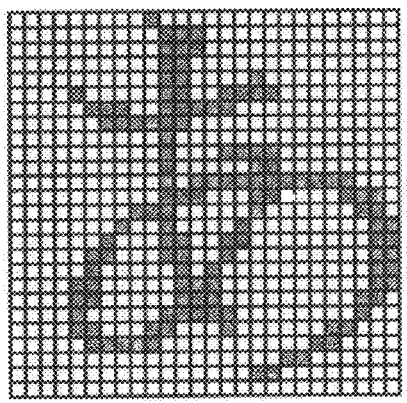
Figure 16E:
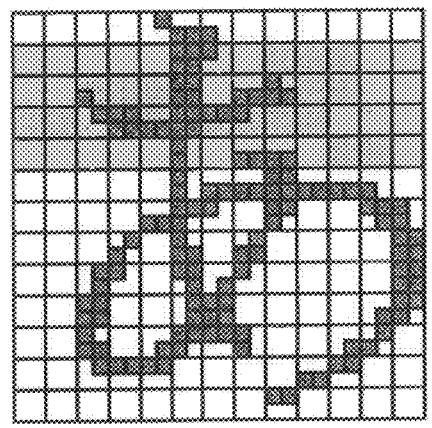
Figure 17:
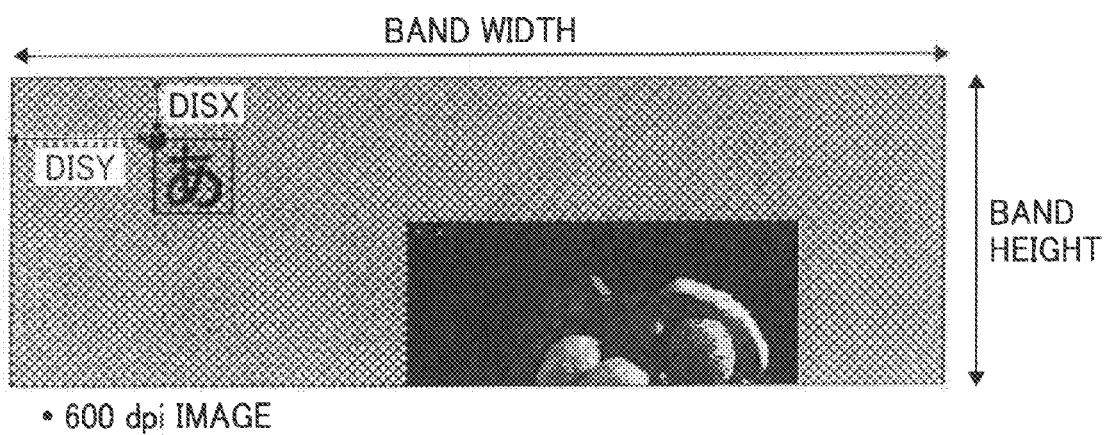
FIG. 17 is a diagram for explaining a position of a character image region on an image having undergone resolution-downconverting processing.

FIG. 15 is a flowchart showing a relevant portion of the flow of image processing for the character image region. FIGS. 16A to 16E are diagrams of images for explaining the image processing performed at the character image region. FIG. 17 is an explanatory diagram of a position (DISX, DISY) of a character image region on an image having undergone resolution-downconverting processing.

First, a character image is temporarily plotted on a temporary storage area (not shown) in the main memory 110 at the resolution unchanged from the input resolution of 1,200 dpi (Step S11). FIG. 16A is a view of the region (the entire character image region) based on the thus-plotted image data. Thereafter, data indicating a position (the upper left corner of the character image region) of the character image region on an image, of which resolution is reduced to 600 dpi by the resolution-downconverting processing, which will be explained later, is acquired as low-resolution pixel coordinate data (DIX=DISX, DIY=DISY) (Step S12). Simultaneously, micropixel coordinate data (IX=0, IY=0) for target pixels (1,200 dpi) of the processing within the character image region is set (Steps S13, S14). Next, 2×2 micropixels (1,200 dpi) are read out based on the thus-set micropixel coordinate data (IX, IY) (Step S15). Of the 2×2 micropixels, a micropixel positioned at the upper left is taken to be a zeroth micropixel, a micropixel positioned at the upper right is taken to be a first micropixel, a micropixel positioned at the lower left is taken to be a second micropixel, and a micropixel positioned at the lower right is taken to be a third micropixel.

It is determined whether the zeroth micropixel of the read 2×2 micropixels is a character-constituting micropixel that constitutes a character image (Step S16). If the micropixel is determined not to be a character-constituting micropixel, the zeroth micropixel data is taken to be "0" (Step S17). If the micropixel is determined to be a character-constituting micropixel, the zeroth micropixel data is taken to be "1" (Step S18).

It is then determined whether the first micropixel of the 2×2 micropixels is a character-constituting micropixel that constitutes a character image (Step S19). If the micropixel is determined not to be a character-constituting micropixel, the first micropixel data is taken to be "0" (Step S20). If the micropixel is determined to be a character-constituting micropixel, the first micropixel data is taken to be "1" (Step S21).

Similarly, it is then determined whether the second micropixel of the 2×2 micropixels is a character-constituting micropixel that constitutes a character image (Step S22). If the micropixel is determined not to be a character-constituting micropixel, the second micropixel data is taken to be "0" (Step S23). If the micropixel is determined to be a character-constituting micropixel, the second micropixel data is taken to be "1" (Step S24).

Similarly, it is then determined whether the third micropixel of the 2×2 micropixels is a character-constituting micropixel that constitutes a character image (Step S25). If the micropixel is determined not to be a character-constituting micropixel, the third micropixel data is taken to be "0" (Step S26). If the micropixel is determined to be a character-constituting micropixel, the third micropixel data is taken to be "1" (Step S27).

If each micropixel data for the 2×2 micropixels are determined, the four items of micropixel data are stored in the micropixel band image memory storage area in the main memory 110 as 4-bit layout pattern data.

If layout pattern data is generated and stored in this manner, the resolution of the 2×2 micropixels (1,200 dpi) is dropped to 600 dpi to give one low-resolution pixel. The low-resolution pixel is written in a position indicated by the low-resolution pixel coordinate data (DIX, DIY) (Step S28). FIG. 16B is a view of the region (the entire character image region) based on the thus-obtained image data.

RGB data for a background image of the 2×2 micropixels (1,200 dpi) at the same position is subjected to the same processing. The resolution is also reduced to 600 dpi to give one low-resolution pixel, and is written to the position of the low-resolution pixel coordinate data (DIX, DIY) (Step S29). FIG. 16C is a view of the region (the entire character image region) based on the thus-obtained image data.

If writing of the first 2×2 micropixels within the character image region is completed in this manner, first, for the X-coordinate, an X-component of the micropixel coordinate data is set to IX=IX+2 and an X-component of the low-resolution pixel coordinate data is set to DIX=DIX+1 (Step S30). At this time, it is determined whether the X-component IX of the micropixel coordinate data having been set is equal to or smaller than the width (character width) of the character image region (Step S31). If the X-component is determined to be equal to or smaller than the character width, the processing returns to step S15. The 2×2 micropixels (1,200 dpi) are then read out based on the newly-set micropixel coordinate data (1×=2, IY=0) and the processing is repeated. On the other hand, if the X-component is not determined to be equal to or smaller than the character width, for the Y-coordinate, the Y-component of the micropixel coordinate data is set to IY=IY+2, and the Y-component of the low-resolution pixel coordinate data is set to DIY=DIY+1 (Step S32). It is then determined whether the Y-component IY for the micropixel coordinate data set at Step S32 is equal to or smaller than the height (character height) of the character image region (Step S33). When the Y-component IY is determined to be equal to or smaller than the character height, the processing returns to step S14, the X-component for the micropixel coordinate data and the X-component for the low-resolution pixel coordinate data are set to respective initial values of IX=0, DIX=DISX, and the above processing is repeated. On the other hand, if the Y-component IY is determined not to be equal to or smaller than the character height at Step S33, the processing ends.

Next, image processing for the thus-generated low-resolution (600 dpi) image data will be explained. The image processing referred to here is mainly color conversion, resolution conversion (resolution-upconverting processing), and half-tone processing, and is carried out by the image processing device 140.

Figure 18B:
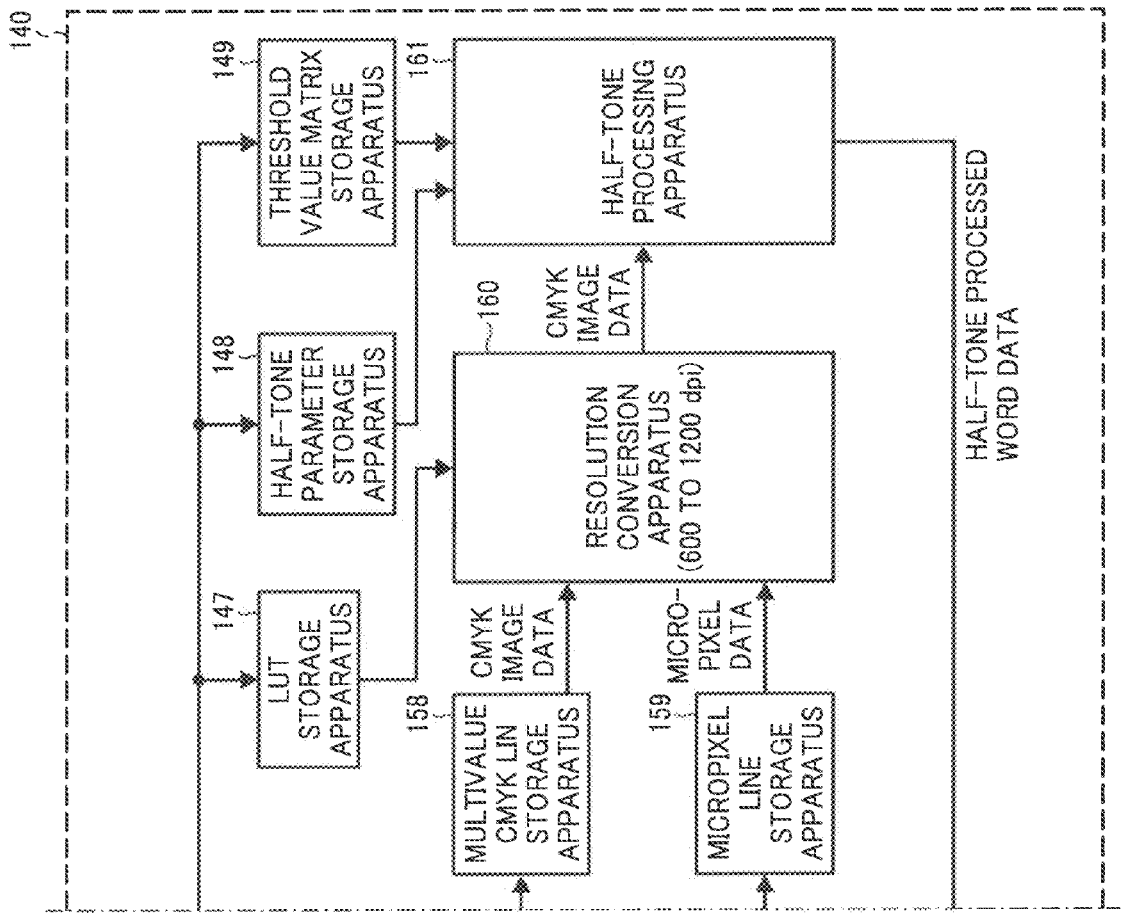
FIG. 18 is a block diagram of an image processing device in the electrical unit shown in FIG. 2.

FIG. 18 is a block diagram of the image processing device 140. Before carrying out the image processing, which will be explained later, the image processing device 140 reads various image processing parameters stored in the main memory 110 from the central control apparatus 101 using an image processing parameter reading apparatus 142 via a bus arbiter I/F 141. Of the image processing parameters, a DMA parameter is transferred to a DMA parameter storage apparatus 144, lattice point data is transferred to a lattice point data storage apparatus 145, gamma data is transferred to a gamma table storage apparatus 146, a half-tone parameter is transferred to a half-tone parameter storage apparatus 148, and the threshold data is transferred to a threshold value matrix storage apparatus 149. A parameter address generating apparatus 143 generates a memory address, at which the image processing parameter reading apparatus 142 reads parameters from the image processing parameter storage area. A band image address generating apparatus 151 generates a memory address, at which an RGB band image reading apparatus 150 reads an RGB band image from the RGB band image memory storage area. A micropixel data address generating apparatus 155 generates a memory address, at which a micropixel data reading apparatus 154 reads a micropixel band image from the micropixel band image memory storage area. A post image processing image address generating apparatus 163 generates a memory address, at which a post image processing image writing apparatus 164 writes an image having undergone image processing in the post half-tone processing band memory storage area. A half-tone processing apparatus 161 outputs half-tone processed word data, which is image data having undergone half-tone processing.

LUT data stored in the main memory 110 is also read out by the image processing parameter reading apparatus 142 via the bus arbiter I/F 141 and transferred to an LUT storage apparatus 147. Color information described in the LUT and stored in the main memory 110 is 24-bit RGB data. Conversion necessary to process this data in CMYK mode is then carried out. The converted data is stored in the LUT storage apparatus 147 as an LUT for each of the CMYK colors.

Figure 19:
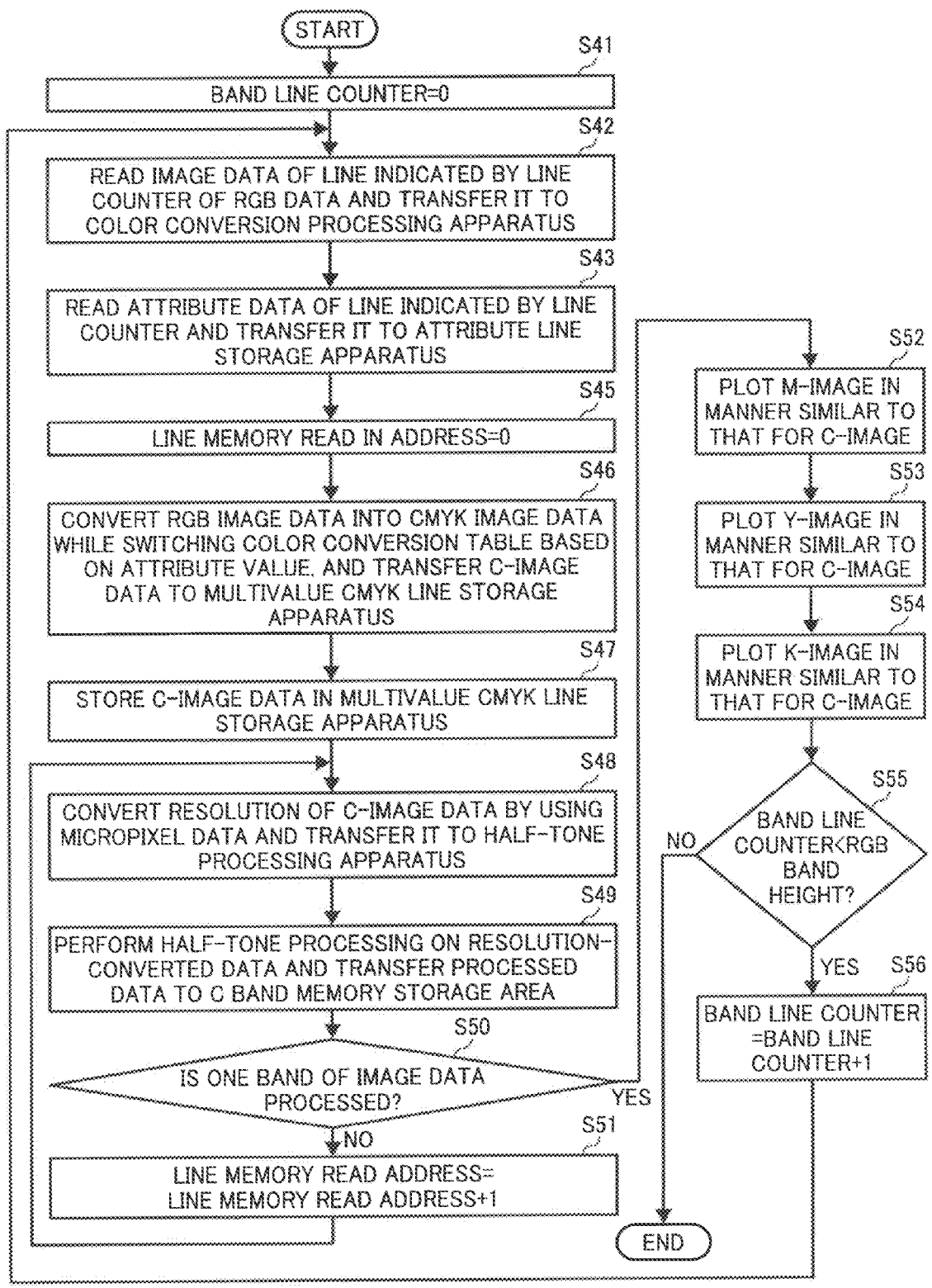
FIG. 19 is a flowchart showing the flow of the image processing carried out by the image processing device shown in FIG. 19.

FIG. 19 is a flowchart showing the flow of the image processing carried out by the image processing device 140. The image processing device 140 first sets a band line counter to zero (Step S41). RGB data (600 dpi) for a line of the thus-set band line counter is then read in by the RGB band image reading apparatus 150 via the bus arbiter I/F 141 and is transferred to a color conversion processing apparatus 157 via an RGB data buffer apparatus 152 and an RGB data cut-out apparatus 153 (Step S42). At this time, an attribute value based on the PDL data is also read in and is transferred to an attribute line storage apparatus (not shown). The image processing device 140 causes the micropixel data reading apparatus 154 to read attribute data (layout pattern data and an LUT address) for a line of the band line counter via the bus arbiter I/F 141 and transfer the data to a micropixel line storage apparatus 159 via a micropixel data buffer apparatus 156 (Step S43).

Next, the image processing device 140 sets a line memory read-in address to zero (Step S45). The color conversion processing apparatus 157 of the image processing device 140 then reads in the RGB data (24-bit) from the RGB data cut-out apparatus 153 for each of low-resolution pixels and reads in the attribute data (the layout pattern data and the LUT address) from the micropixel line storage apparatus 159. Thereafter, the color conversion processing apparatus 157 reads in the attribute value from the attribute line storage apparatus. The color conversion processing apparatus 157 then selects a color conversion table according to the thus-read attribute and converts the RGB data (24-bit) to CMYK data for each of the low-resolution pixels, thereby generating C-image data (multivalue data). The thus-generated C-image data is then transferred to a multivalue CMYK line storage apparatus 158 (Step S46).

If C-image data for one line is stored in the multivalue CMYK line storage apparatus 158 (Step S47), next, a resolution conversion apparatus 160, which is a resolution-upconverting unit, carries out resolution-upconverting processing to convert the resolution of the C-image data from 600 dpi to the output resolution of 1,200 dpi. The processed C-image data is then transferred to the half-tone processing apparatus 161, which is a half-tone processing unit (Step S48). At this time, resolution-upconverting processing is carried out on the character image region using micropixel data (layout pattern data and LUT address), which is the attribute data stored in the micropixel line storage apparatus 159, and the LUT, which is for C-image and stored in the LUT storage apparatus 147. The details of the resolution-upconverting processing for the character image region will be explained later.

Next, the half-tone processing apparatus 161 reads in the attribute value from the attribute line storage apparatus and selects a threshold value table according to the attribute to perform half-tone processing (gradation processing) on the C-image data having undergone the resolution-upconverting processing. The processed data is transferred to a post image processing image buffer apparatus 162 (Step S49). The C-image data having undergone the half-tone processing and transferred to the post image processing image buffer apparatus 162 is written in a C band memory storage area in a post half-tone processing band memory storage area in the main memory 110 via the bus arbiter I/F 141 and the bus I/F 131 and passing through the bus 120 by the post image processing image writing apparatus 164 under control of the central control apparatus 101.

It is then determined whether processing for one band is completed (Step S50). When processing for one band is not completed, 1 is added to the line memory write address (Step S51), and the processing pertaining to Steps S48 to S50 is repeated. When it is determined that processing for one band is completed, the processing pertaining to Steps S45 to S51 for M-image data, that for Y-image data, and that for K-image data are carried out (Steps S52 to S54). If processing for one band for C-, M-, Y- and K-image data is completed, it is determined whether the value for the band line counter is smaller than the image height (RGB height) of one page (Step S55). When it is determined that the value of the band line counter is smaller than the height of the RGB band, "1" is added to the value of the band line counter (Step S56), and the processing pertaining to Steps S42 to S55 is carried out. On the other hand, the processing ends when it is determined that the value of the band line counter is not smaller than the height of the RGB band.

Figure 20:
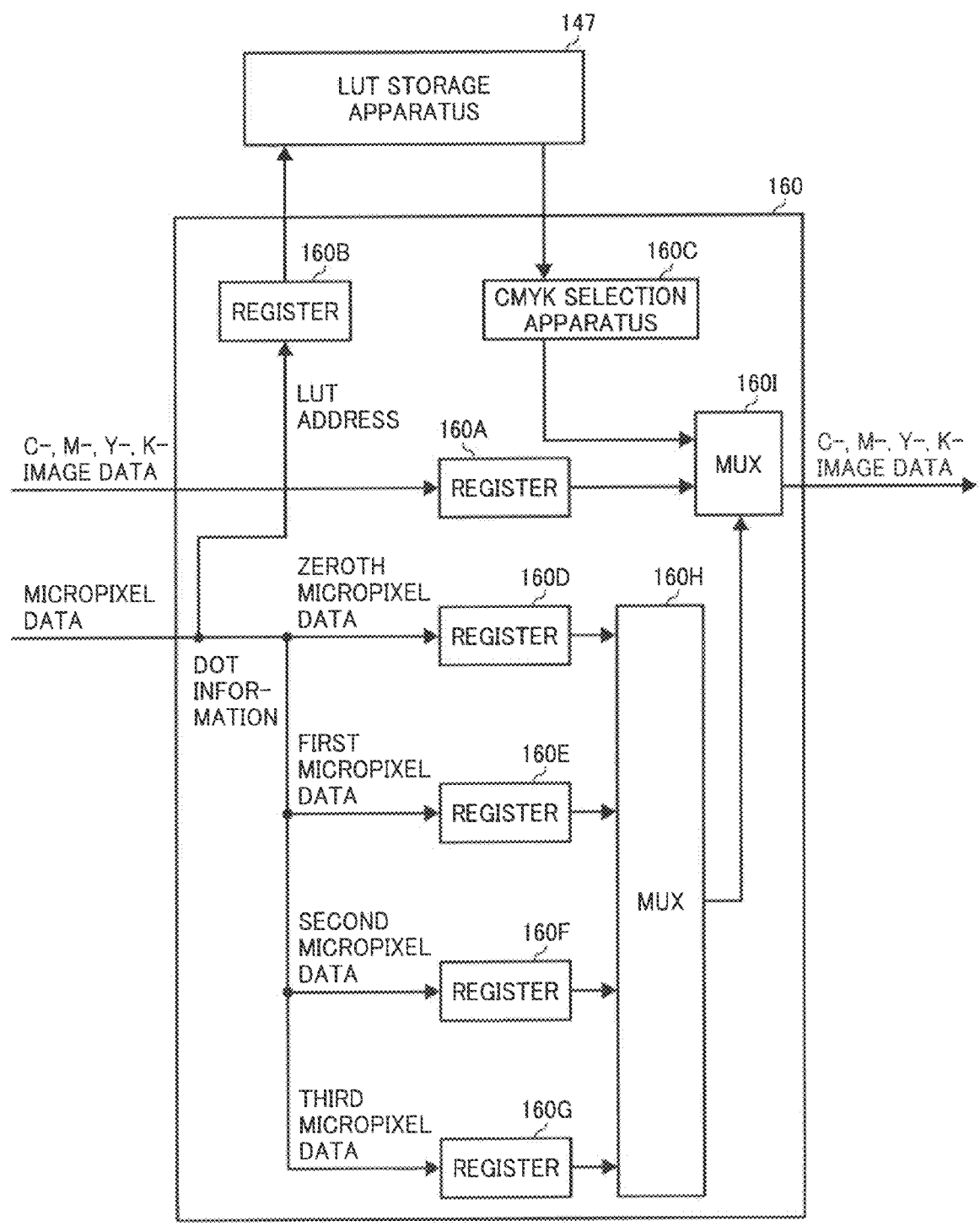
FIG. 20 is a block diagram of a resolution conversion apparatus in the image processing device shown in FIG. 18.

Next, the resolution-upconverting processing for the character image region will be specifically described in detail. FIG. 20 is a block diagram of the resolution conversion apparatus 160. A register 160A holds each the C-, M-, Y-, and K-image data read in from the multivalue CMYK line storage apparatus 158 temporarily and transfers the data to a multiplexer (MUX) 160I. A register 160B temporarily holds the LUT address data for the micropixel data (the layout pattern data and the LUT address), which is the attribute data read in from the micropixel line storage apparatus 159 for use in transfer to the LUT storage apparatus 147.

A CMYK selection apparatus 160C reads out C, M, Y, and K color information (second color information) corresponding to the LUT address from the LUT stored in the LUT storage apparatus 147, selects color information for a color to be processed from the read out C, M, Y, and K color information, and transfers the selected information to the MUX 160I.

A register 160D temporarily holds the zeroth micropixel data of the layout pattern data (DOT information) of the micropixel data (layout pattern data and LUT address), which is the attribute data read in from the micropixel line storage apparatus, and transfers the zeroth micropixel data to a MUX 160H.

A register 160E also temporarily holds the first micropixel data of the layout pattern data (DOT information) of the micropixel data (layout pattern data and LUT address), which is the attribute data read in from the micropixel line storage apparatus, and transfers the first micropixel data to the MUX 160H.

A register 160F also temporarily holds the second micropixel data in the layout pattern data (DOT information) of the micropixel data (layout pattern data and LUT address), which is the attribute data read in from the micropixel line storage apparatus, and transfers the second micropixel data to the MUX 160H.

A register 160G also temporarily holds the third micropixel data in the layout pattern data (DOT information) of the micropixel data (layout pattern data and LUT address), which is the attribute data read in from the micropixel line storage apparatus, and transfers the third data to the MUX 160H.

The MUX 160H sends to the MUX 160I zeroth to third micropixel flag values (shape information) read from the registers 160E to 160G.

When the flag value sent from the MUX 160H is "0", the MUX 160I transfers the image data read from the register 160A to the half-tone processing apparatus 161 in the order of the zeroth to third micropixels (1,200 dpi) for each of the CMYK colors. When the flag value sent from the MUX 160H is "1", the MUX 160I transfers the color information read from the CMYK selection apparatus 160C to the half-tone processing apparatus 161 for each of the CMYK colors.

Figure 21A:
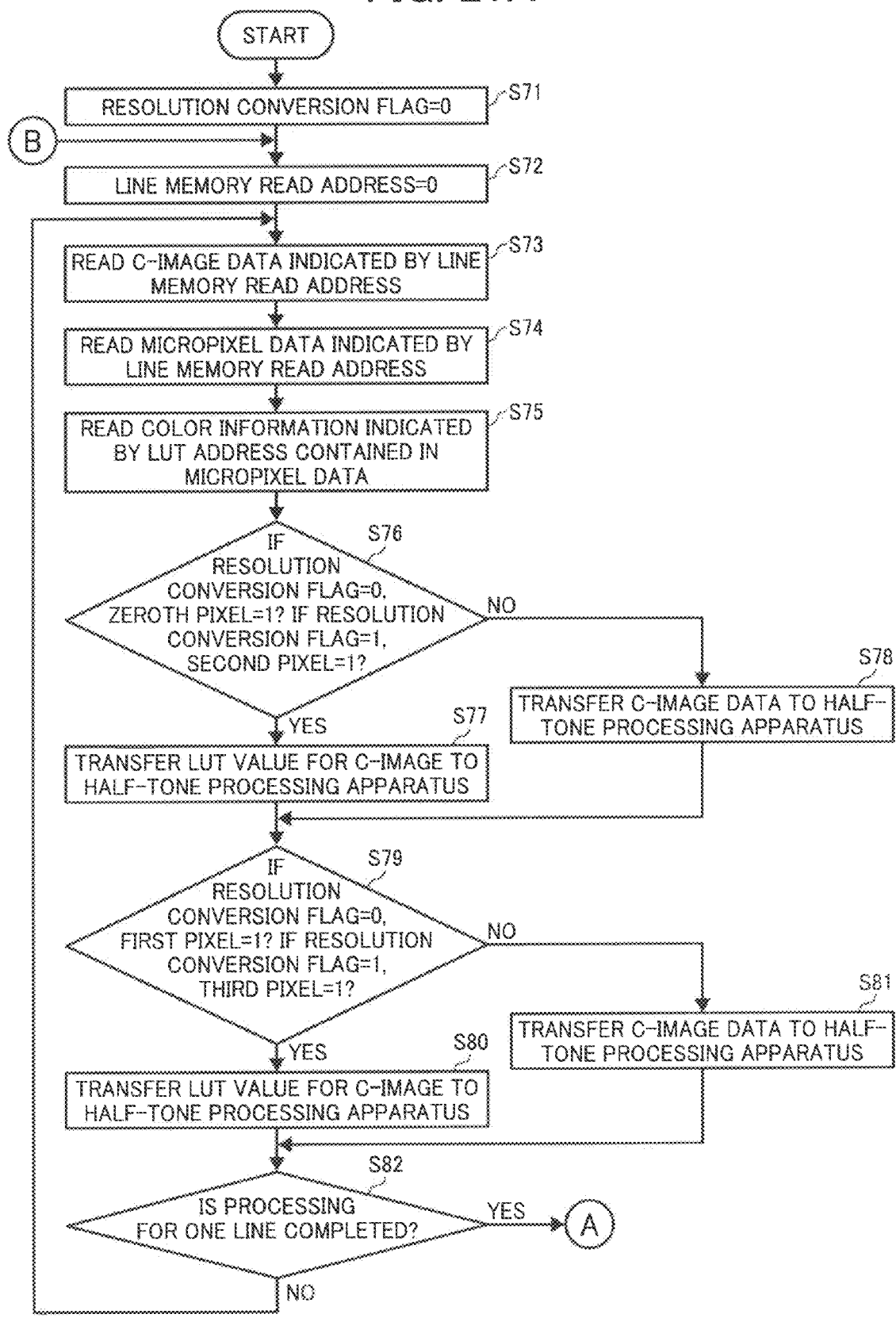
FIGS. 21A and 21B are a flowchart showing the flow of resolution-upconverting processing carried out by the resolution conversion apparatus shown in FIG. 20.
Figure 21B:
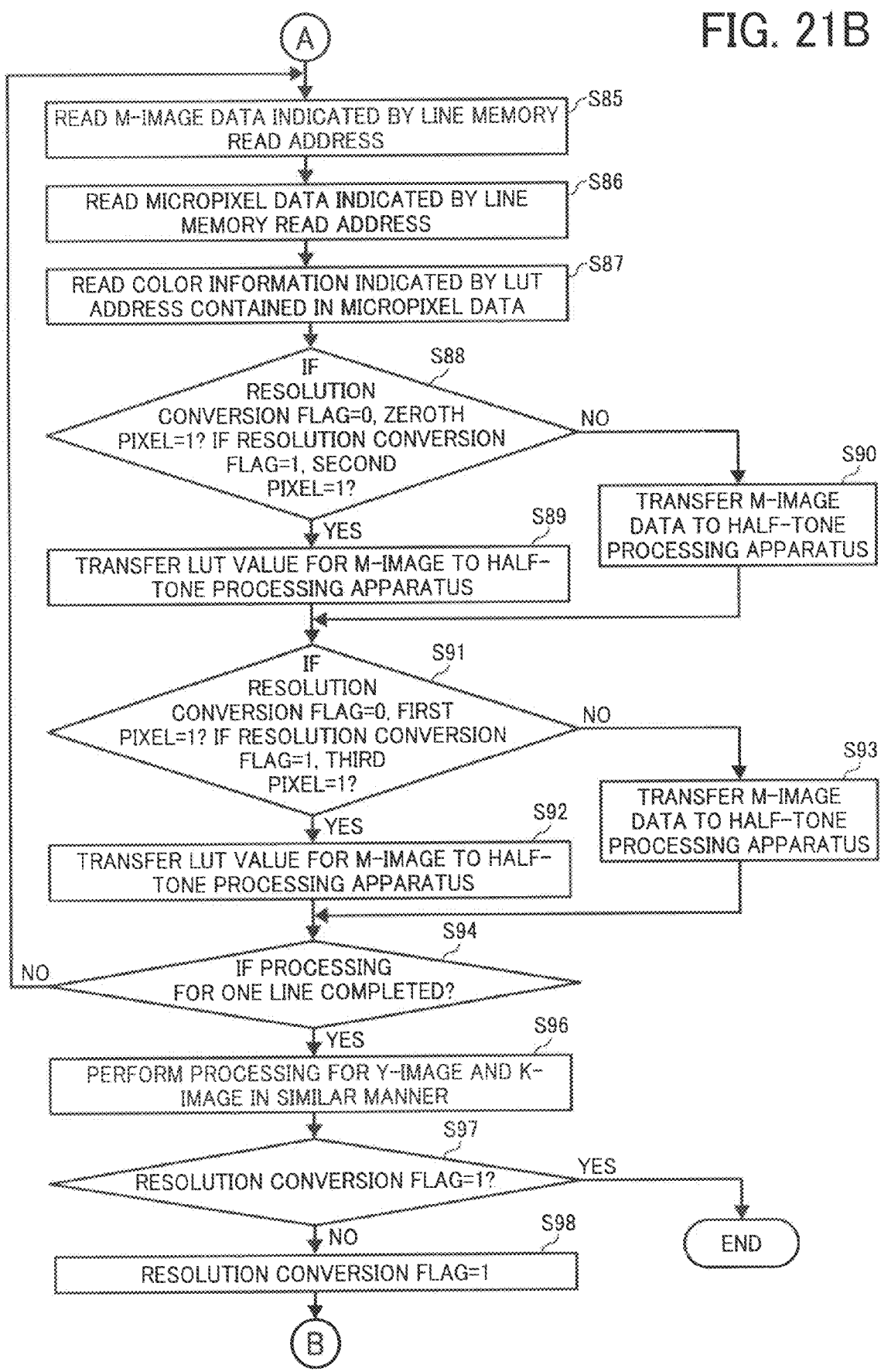

FIGS. 21A and 21B are a flowchart showing the flow of the resolution-upconverting processing carried out by the resolution conversion apparatus 160.

First, the resolution conversion apparatus 160 sets a resolution conversion flag to zero (Step S71) and sets the line memory read address to zero (Step S72). C-image data indicated by the thus-set line memory read address is read out from the multivalue CMYK line storage apparatus 158 (Step S73). Further, micropixel data, which is attribute data indicated by the set line memory read address, is read in from the micropixel line storage apparatus 159 (Step S74). Color information indicated by the thus-read LUT address of the micropixel data is read in from a C-LUT stored in the LUT storage apparatus 147 (Step S75). When the resolution conversion flag is "0", it is determined whether the zeroth micropixel layout pattern data (DOT information) is "1". When the resolution conversion flag is "1", it is determined whether the layout pattern data (DOT information) for the second micropixel is "1" (Step S76). If it is determined that the DOT information is "1", the color information read from the CMYK selection apparatus 160C, i.e. the color information based on the LUT address, is transferred to the half-tone processing apparatus 161 (Step S77). If the DOT information is determined not to be "1", the C-image data read from the multivalue CMYK line storage apparatus 158 is transferred to the half-tone processing apparatus 161 (Step S78). When the resolution conversion flag is "0", it is determined whether the first micropixel layout pattern data (DOT information) is "1". When the resolution conversion flag is "1", it is determined whether the layout pattern data (DOT information) for the third micropixel is "1" (Step S79). If it is determined that the DOT information is "1", the color information read from the CMYK selection apparatus 160C, i.e. the color information based on the LUT address, is transferred to the half-tone processing apparatus 161 (Step S80). If the DOT information is determined not to be "1", the C-image data read from the multivalue CMYK line storage apparatus 158 is transferred to the half-tone processing apparatus 161 (Step S81).

Thereafter, it is determined whether processing for one line is completed (Step S82). When processing for one line is not completed, the processing pertaining to S73 to S81 is repeated. On the other hand, if the processing for one line is completed, M-image data indicated by the set line memory read address is read in from the multivalue CMYK line storage apparatus 158 (Step S85). Further, micropixel data, which is attribute data indicated by the line memory read address having been set, is read in from the micropixel line storage apparatus 159 (Step S86). Color information indicated by the thus-read LUT address of the micropixeldata is read in from an M-LUT stored in the LUT storage apparatus 147 (Step S87). When the resolution conversion flag is "0", it is determined whether the zeroth micropixel layout pattern data (DOT information) is "1". When the resolution conversion flag is "1", it is determined whether the layout pattern data (DOT information) for the second micropixel is "1" (Step S88). If it is determined that the DOT information is "1", the color information read from the CMYK selection apparatus 160C, i.e. the color information based on the LUT address, is transferred to the half-tone processing apparatus 161 (Step S89). If the DOT information is determined not to be "1", the M-image data read from the multivalue CMYK line storage apparatus 158 is transferred to the half-tone processing apparatus 161 (Step S90). When the resolution conversion flag is "0", it is determined whether the first micropixel layout pattern data (DOT information) is "1". When the resolution conversion flag is "1", it is determined whether the layout pattern data (DOT information) for the third micropixel is "1" (Step S91). If it is determined that the DOT information is "1", the color information read from the CMYK selection apparatus 160C, i.e. the color information based on the LUT address, is transferred to the half-tone processing apparatus 161 (Step S92). On the other hand, if the DOT information is determined not to be "1", the M-image data read from the multivalue CMYK line storage apparatus 158 is transferred to the half-tone processing apparatus 161 (Step S93).

Thereafter, it is determined whether processing for one line is completed (Step S94). When processing for one line is not completed, the processing pertaining to S85 to S81 is repeated. On the other hand, if it is determined that processing for one line is completed, the same processing as explained above is carried out for a Y-image and a K-image (Step S96). It is then determined whether the value of the resolution conversion flag is "1" (Step S97). If the value of the resolution conversion flag is not "1", the resolution conversion flag is set to "1" (Step S98) and the processing pertaining to Steps S72 to S97 is carried out. On the other hand, at Step S97, if the value of the resolution conversion flag is determined to be "1", the processing ends.

By carrying out the resolution-upconverting processing explained above, even when a high resolution, 1,200 dpi, of an input image is temporarily downconverted to a low resolution of 600 dpi and thereafter upconverted to 1,200 dpi for an output image, pixels (1,200 dpi) in the output image corresponding to character-constituting micropixels (1,200 dpi) in the input image are reproduced with the same colors as those of characters in the input image by using color information based on an LUT. A result of this processing is schematically depicted in FIG. 16D. Because color information for background pixels is reproduced at the downconverted low resolution, the thus-processed final image is printed as shown in FIG. 16E. Thus, it is possible to maintain an image quality of the character image at a level equivalent to that of the inputted image even when it is required to temporarily downconvert a resolution to a low-resolution of 600 dpi.

Figure 22:
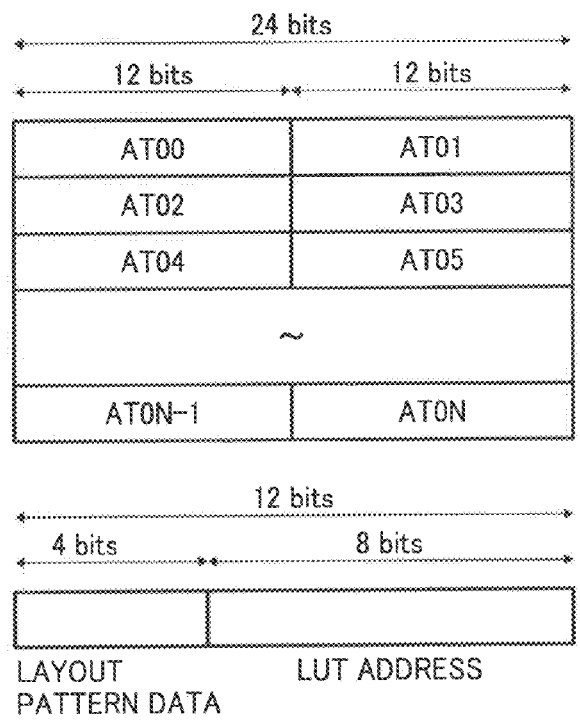
FIG. 22 is an explanatory diagram of another example of a memory format for the micropixel band image memory storage area shown in FIG. 12.

In this embodiment, the memory format for the micropixel band image memory storage area, in which the attribute data (the layout pattern data and the LUT address) is stored, in the main memory 110 is, as shown in FIG. 12, provided such that 8 bits of attribute data (4 bits of layout pattern data and 4 bits of LUT address) are stored consecutively for each pixel in the order of pixel numbers (00 to 0n). Various apparatus such as the CPU of this embodiment operates on a 32-bit system. It is therefore possible to store all of the data necessary for one low-resolution pixel (24 bits of RGB data, 4 bits of layout pattern data, 4 bits of LUT address) in one word. As a result, all of the data necessary for one low-resolution pixel (24 bits of RGB data, 4 bits of layout pattern data, 4 bits of LUT address) can be read out from the main memory 110 in one read operation and effective processing is therefore possible. However, the LUT address is 4 bits. This means that the number of available colors for a character image is disadvantageously limited to 16. When more than 16 colors is desired, it is possible to adopt a memory format as shown in FIG. 22. In this case, 256 colors can be used for character images because the LUT address is extended to 8 bits.

Figure 23:
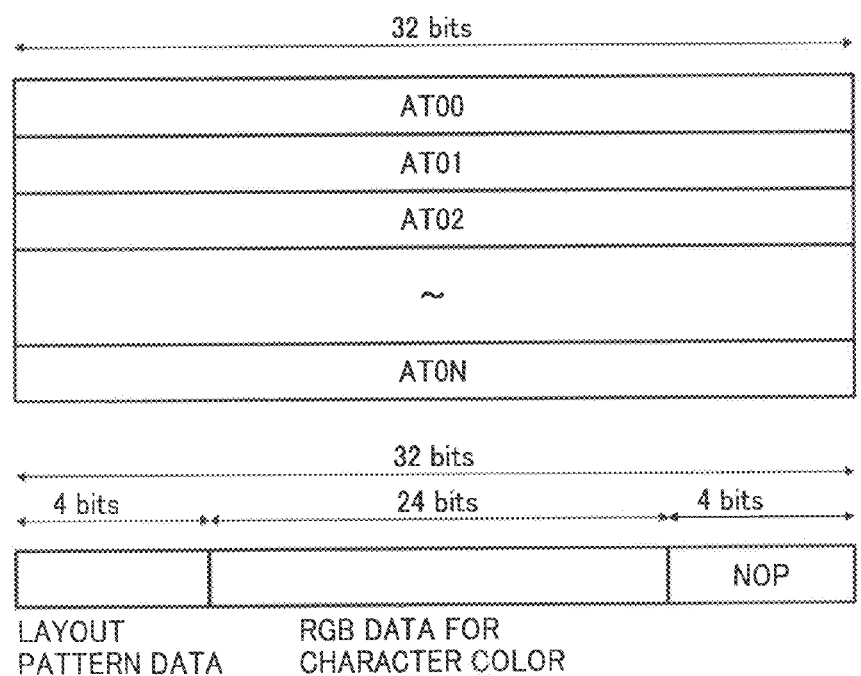
FIG. 23 is an explanatory diagram of still another example of a memory format for the micropixel band image memory storage area shown in FIG. 12.

In this embodiment, colors of character images are controlled using the LUT method. However, in place of the LUT address, 24-bit RGB data per se can be used to control the colors of character images. A memory format for use in this control is shown in FIG. 23.

In this embodiment, colors of character images are controlled using the LUT method and colors of background images are controlled using the image data per se; however, a reversed combination thereof is also possible. That is, it is possible to control colors of the background images using the LUT method and to control colors of the character images using image data per se.

The printer according to the embodiment is an image forming apparatus equipped with the electrical unit 100 and an image forming unit. The electrical unit 100 is an image processing device that performs predetermined image processing on image data based on PDL data, which is input data for an image (input image) to be subjected to processing and has color information (RGB data) for each pixel, and outputs output image data. The image forming unit forms an image based on the output image data supplied from the image processing device.

The electrical unit 100 is an image processing device that has the band plotting processing unit 205, the RGB band image memory storage area in the main memory 110, the micropixel band image memory storage area in the main memory 110, the micropixel RGB band image memory storage area in the main memory 110, and the resolution conversion apparatus 160. The band plotting processing unit 205 is a color information plotting unit that analyzes input data and plots images by using color information (RGB data) corresponding to an image to be printed for each pixel.

The RGB band image memory storage area is a color information storage unit that stores therein color information (RGB data) for images generated by the band plotting processing unit 205. The band plotting processing unit 205 is also a fine image plotting unit that analyzes input data and generates layout pattern data (DOT information) that is low-resolution (600 dpi) micropixel color information (RGB data) and high-resolution (1,200 dpi) micropixel shape information. The micropixel band image memory storage area is a micropixel shape information storage unit that stores therein the layout pattern data (DOT information) generated by the band plotting processing unit 205.

The micropixel RGB band image memory storage area is a micropixel color information storage unit that stores therein micropixel color information (RGB data) generated by the band plotting processing unit 205. The resolution conversion apparatus 160 is a resolution-upconverting unit that converts the color information stored in the RGB band image memory storage area in the main memory 110, the layout pattern data (DOT information) stored in the micropixel band image memory storage area, and the micropixel color information (RGB data) stored in the micropixel RGB band image memory storage area to a high-resolution (1,200 dpi).

The electrical unit 100 also has the communication controller 102, the band plotting processing unit 205, the resolution conversion apparatus 160, the engine controller 134, the main memory 110, and the band plotting processing unit 205, the band plotting processing unit 205. The communication controller 102 is an input unit that receives input of PDL data that is input data for an image to be subjected to processing and has color information (RGB data) for each pixel. The band plotting processing unit 205 is a resolution-downconverting conversion unit that carries out resolution-downconverting processing to lower PDL data inputted at the communication controller 102 to a resolution (600 dpi) lower than an output resolution (1,200 dpi).

The resolution conversion apparatus 160 is a resolution-upconverting unit that increases the resolution of the low-resolution image data subjected to resolution-downconverting processing by the band plotting processing unit 205 to the output resolution (1,200 dpi). The engine controller 134 is an output unit that outputs output image data after high resolution processing is carried out by the resolution conversion apparatus 160. The main memory 110 is a storage unit.

The band plotting processing unit 205 is a specific image region detection unit that detects a character image region, which is a specific image region determined in advance and includes a character image that is a specific image and a background image other than the character image from within an input image based on the PDL data. The band plotting processing unit 205 is also a first color information processing unit that generates first color information (RGB data) corresponding to colors for a background image based on PDL data each low-resolution pixel that is a pixel subjected to resolution-downconverting processing for at least a character image region, and stores the generated first color information in an RGB band image memory storage area in the main memory 110. The band plotting processing unit 205 is also a plotting unit that temporarily plots image data of a character image region based on PDL data in a temporary storage area in the main memory 110. The band plotting processing unit 205 is also a shape information processing unit that generates layout pattern data (DOT information), which is shape information indicating an internal arrangement for the low-resolution pixels of character-constituting micropixels (specific input resolution pixels) constituting a character image of input resolution pixels (1,200 dpi) for the pixels not yet subjected to resolution-downconverting processing based on PDL data each low-resolution pixel for the character image region by analyzing the image data within the temporary storage area plotted in the main memory 110 by the band plotting processing unit 205, and stores the generated layout pattern data (DOT information) in the micropixel band image memory storage area in the main memory 110.

The band plotting processing unit 205 is also a second color information processing unit that generates, for a character image region, second color information (RGB data) corresponding to colors of a character image based on PDL data each low-resolution pixel for the character image data, and stores the generated second color information in the micropixel RGB band image memory storage area in the main memory 110.

With these low-resolution pixels of the character image region, the resolution conversion apparatus 160 decides the layout of output resolution pixels (1,200 dpi), that are pixels after resolution-upconverting processing based on layout pattern data (DOT information) stored in the micropixel band image memory storage area in the main memory 110. The resolution conversion apparatus 160 also decides colors for the character images and background images based on the first color information and the second color information stored in the RGB band image memory storage area and the micropixel RGB band image memory storage area in the main memory 110 and subjects the low-resolution image data to resolution-upconverting processing.

This configuration allows, by carrying out the image processing on image data of a low-resolution (600 dpi), which is lowered than the resolution (1,200 dpi) of input image data based on PDL data, to keep a required memory capacity small and suppress a decrease in image quality of character images that have substantial influence on the image quality when viewed with eyes due to this temporary dropping to low-resolution.

In this embodiment, the main memory 110 stores therein character image color information (RGB data), which is the second color information that is color information of micropixels, using the LUT method. Specifically, the band plotting processing unit 205 stores in the micropixel RGB band image memory storage area in the main memory 110 color information (RGB data) for character images generated for each of low-resolution pixels in the character image region using the LUT method for each color and stores LUT addresses indicating the color information for the character images corresponding to the low-resolution pixels in the micropixel band image memory storage area in the main memory 110 in a state of being correlated with layout pattern data (DOT information) for the low-resolution pixels. It is therefore possible to keep the total amount of data required for each low-resolution pixel small. Accordingly, all the data pertaining to one low-resolution pixel can be read out from the main memory 110 in only one reading operation. Processing can therefore be made efficient.

It is also possible to change to a format for the micropixel RGB band image memory storage area in the main memory 110 to a format that allows longer LUT address when the number of colors needs to be increased. When the format is changed in such a manner, not only processing can be performed efficiently when the number of colors falls within a range that is controllable with the LUT method, but also it becomes possible to control colors of the number larger than the range with reduced efficiency.

In this embodiment, color information for character images is controlled using the LUT method. However, it is also possible to adopt a format where the information for the character images is also taken to be 24-bit RGB data as in the case of the color information for the background images as shown in the memory format shown in FIG. 23.

In this embodiment, the band plotting processing unit 205 generates low-resolution (600 dpi) micropixel color information and high-resolution (1,200 dpi) layout pattern data (DOT information) after generating a 1,200 dpi high-resolution image in the temporary storage area. This means that the data can be obtained using comparatively simple processing.

In this embodiment, the main memory 110 stores the layout pattern data (DOT information) in units of low-resolution micropixel color information stored in the micropixel RGB band image memory storage area in the main memory 110. This facilitates control of the layout pattern data (DOT information) and the micropixel color information for each pixel.

In this embodiment, the half-tone processing apparatus 161, which is the half-tone processing unit that subjects C-, M-, Y-, and K-image data (1,200 dpi) converted by the resolution conversion apparatus 160 to half-tone processing (gradation processing). This means that finely detailed half-tone representation is possible and that images can be made high quality.

In this embodiment, the resolution conversion apparatus 160 carries out resolution conversion by reading in color information stored in the RGB band image memory storage area in the main memory 110, layout pattern data (DOT information) stored in the micropixel band image memory storage area, and micropixel color information (RGB data) stored in the micropixel RGB band image memory storage area, in line units. It is therefore possible to make the processing efficient.

In this embodiment, first color information (color information for background image) generated by the band plotting processing unit 205 is 24-bit information. This is an amount of information smaller than one word (32-bit) that is the minimum amount of information that can be read from the main memory 110 at one time. The total amount of information for the 4-bit layout pattern data (DOT information) generated by the band plotting processing unit 205 and the 4-bit LUT address for the second color information (character image color information) generated by the band plotting processing unit 205 is smaller than the remaining amount of information (8-bit) after the amount of information for the first color information (24-bit) is subtracted from one word. It is therefore possible to make the processing efficient.

According to aspects of the present invention, shape information is generated and stored each low-resolution pixel for specific images such as character images that are substantially susceptible to picture quality being influenced by temporarily lowering the resolution when viewed by eye after carrying out resolution-downconverting processing. This shape information is information indicating the internal arrangement of the low-resolution pixels of specific input resolution pixels constituting a specific image, of the input resolution pixels before carrying out resolution-downconverting processing. It is therefore possible to specify the shape (outline) of a specific image of the resolution of the input data using this shape information. According to the aspects, a post-resolution-upconversion-shape (outline) of a specific image, the resolution of which is temporarily dropped, is determined based on the shape information when resolution-upconverting processing is performed on the resolution-dropped image data. It is therefore possible to make the shape (outline) of the specific image in output image data to be the same with that prior to be subjected to the resolution downconversion, i.e. the shape (outline) of at the resolution of the input data.

According to the present invention, it is possible to keep the memory capacity required to carry out image processing on image data, the resolution of which has been dropped from that of the inputted image data based on the inputted data, small. It is also possible to suppress lowering of the image quality of specific images such as character images that are substantially influenced by temporary drops to low-resolution when viewed with eyes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
a detecting unit to detect and distinguish a character image region from non-character image regions in input image data having a first resolution by analyzing the input image data;
a generating unit to generate, only for the detected character image region, color information of a pixel converted into a second resolution from the first resolution for each N×M pixel in the character image region, the second resolution being lower than the first resolution, and generate, only for the detected character image region, shape information having the first resolution and indicating an internal arrangement pattern for the character image region constituting micropixels within the N×M pixel, wherein both of N and M are integers, and at least one of N and M is not less than 2;
a first storage unit to store therein the color information;
a second storage unit to store therein the shape information; and
a resolution-converting unit to convert the character image region into a third resolution based on the color information stored in the first storage unit and the shape information stored in the second storage unit, the third resolution being higher than the second resolution, wherein
each of the first, second, and third resolutions are correlated with a specific dots per inch (dpi) ratio for each pixel included in the character image region.

2. The image processing device according to claim 1, wherein the first storage unit stores the color information in a form of a look up table (LUT).

3. The image processing device according to claim 2, wherein, when number of colors that can be stored in the LUT is insufficient, the first storage unit increases addresses of the LUT.

4. The image processing device according to claim 1, further comprising:

a half-tone processing unit that performs half-tone processing on the character image region converted by the resolution-converting unit.

5. The image processing device according to claim 1, wherein the resolution-converting unit reads the color information stored in the first storage unit and the shape information stored in the second storage unit on a line-by-line basis to convert the character image region into the second resolution from the first resolution.

6. The image processing device according to claim 1, wherein the second storage unit stores the shape information in the same units as that of the 1 color information stored in the first storage unit.

7. An image forming apparatus comprising:
 an image processing device that performs predetermined image processing on input image data, the input data having color information for each pixel, and outputs processed image data; and
 an image forming device that forms an image based on the processed image data, the image processing device including:
  a detecting unit to detect and distinguish a character image region from non-character image regions in input image data having a first resolution by analyzing the input image data,
  a generating unit to generate, only for the detected character image region, color information of a pixel converted into a second resolution from the first resolution for each N×M pixel in the character image region, the second resolution being lower than the first resolution, and generate, only for the detected character image region, shape information having the first resolution and indicating an internal arrangement pattern for the character image region constituting micropixels within the N×M pixel, wherein both of N and M are integers, and at least one of N and M is not less than 2,
  a first storage unit to store therein the color information,
  a second storage unit to store therein the shape information, and
  a resolution-converting unit to convert the character image region into a third resolution based on the color information stored in the first storage unit and the shape information stored in the second storage unit, the third resolution being higher than the second resolution, wherein
 each of the first, second, and third resolutions are correlated with a specific dots per inch (dpi) ratio for each pixel included in the character image region.

* * * * *